United States Patent
Oda et al.

(10) Patent No.: US 8,249,464 B2
(45) Date of Patent: Aug. 21, 2012

(54) OPTICAL RECEIVER AND METHOD FOR OPTICAL RECEPTION

(75) Inventors: Shoichiro Oda, Kawasaki (JP); Takeshi Hoshida, Kawasaki (JP); Hisao Nakashima, Kawasaki (JP); Takahito Tanimura, Kawasaki (JP); Yuichi Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 217 days.

(21) Appl. No.: 12/719,258

(22) Filed: Mar. 8, 2010

(65) Prior Publication Data
US 2010/0254718 A1  Oct. 7, 2010

(30) Foreign Application Priority Data

Apr. 3, 2009  (JP) .................... 2009-091312

(51) Int. Cl.
*H04B 10/00* (2006.01)
*H04B 10/06* (2006.01)
*H04J 14/02* (2006.01)

(52) U.S. Cl. ........... 398/162; 398/93; 398/208; 398/209
(58) Field of Classification Search ............ 398/33, 398/94, 158, 162, 163, 202–204, 208–210
See application file for complete search history.

(56) References Cited

U.S. PATENT DOCUMENTS

| | | | | |
|---|---|---|---|---|
| 5,471,336 A | * | 11/1995 | Onaka et al. | 398/204 |
| 7,936,999 B1 | * | 5/2011 | Hawryluck et al. | 398/206 |
| 8,032,034 B2 | * | 10/2011 | Yoshino et al. | 398/183 |

FOREIGN PATENT DOCUMENTS

| | | |
|---|---|---|
| EP | 0 329 186 | 8/1989 |
| EP | 1 933 478 | 6/2008 |
| EP | 2 026 478 | 2/2009 |
| JP | 5-268161 | 10/1993 |
| JP | 5-268162 | 10/1993 |

OTHER PUBLICATIONS

Zhou, et al., "High-Spectral-Efficiency 114-Gb/s Transmission Using PolMux-RZ-8PSK Modulation Format and Single-Ended Digital Coherent Detection Technique", Journal of Lightwave Technology, vol. 27, No. 3, Feb. 1, 2009, pp. 146-152.

Torrengo, et al., "Optical Coherent Receiver Based on Single Side Sub-Carrier Phase-Locked Loop", Electronics Letters, vol. 45, No. 2, Jan. 15, 2009.

European Search Report issued Jul. 7, 2010, for corresponding European Patent Application No. 10158143.7.

X. Zhou, et al., "A Novel DSP Algorithm for Improving the Performance of Digital Coherent Receiver Using Single-Ended Photo Detection," ECOC 2008, Brussels, Belgium, vol. 1, pp. 99-100, Sep. 21-25, 2008.

* cited by examiner

*Primary Examiner* — Dalzid Singh
(74) *Attorney, Agent, or Firm* — Staas & Halsey LLP

(57) ABSTRACT

In-phase signal light and quadrature-phase signal light obtained by mixing input light and local light with each other are converted into digital signals. The quality of a signal to be received is monitored with reference to information obtained through digital signal processing, and the power ratio between the input signal light and the local light that are to be mixed with each other are controlled on the basis of the result of the monitoring.

20 Claims, 20 Drawing Sheets

OPTICAL RECEIVER AND METHOD FOR OPTICAL RECEPTION

CROSS-REFERENCE TO RELATED APPLICATION

This application is based upon and claims the benefit of priority of the prior Japanese Patent Application No. 2009-91312, filed on Apr. 3, 2009, the entire contents of which are incorporated herein by reference.

FIELD

The embodiments discussed herein are an optical receiver and a method for optical reception used in, for example, optical-fiber communication.

BACKGROUND

A digital-coherent optical reception scheme receives a light signal in combination of coherent receiving and digital signal processing. In recent years, an optical receiver conforming to digital coherent scheme in optical-fiber communication has advantages of Optical Signal to Noise Ratio (ONSR) tolerance, dispersion tolerance, and Polarization Mode Dispersion (PMD) tolerance and has prospect of reduction of cost for apparatus units.

For example, this optical receiver causes a light signal transmitted through the optical fibers to interfere with local light so that in-phase signal light I and quadrature-phase signal light Q are obtained. The obtained signal lights are converted into electric signals and then data is demodulated through digital signal processing through the use of a Digital Signal Processor (DSP).

Here, improvement in quality of a receiving signal leads to improvement in performance of the optical receiver and further leads to improvement in performance of the optical-fiber communication system. Additionally, in order to ensure the increase in transmission capacity, maintaining the fine signal quality is an important index.

Prior Art Reference

[Patent Literature]

[Patent Literature 1] Japanese Patent Application Laid-Open (KOKAI) Publication No. HEI 5-268161

[Patent Literature 2] Japanese Patent Application Laid-Open (KOKAI) Publication No. HEI 5-268162

[Non-Patent Literature]

[Non-Patent Literature 1] Xiang Zhou, et al., "A novel DSP algorithm for improving the performance of digital coherent receiver using single-ended photo detection", Mo. 4. D. 1, ECOC 2008, 21-25 Sep. 2008, Brussels, Belgium

SUMMARY

Besides the above object, effects which are derived from the configuration and the operation described in the following embodiments and which cannot be attained by prior technique can be regarded as other objects of the present invention.

For example, the above object is realized by the follows:

(1) According to an aspect of the invention, an optical receiver including: a mixer which mixes input light and local light to obtain in-phase signal light and quadrature-phase signal light; a light receiving device which receives the in-phase signal light and the quadrature-phase signal light and converts the in-phase signal light and the quadrature-phase signal light into respective analog electric signals; an analog-to-digital converter which converts the analog electric signals into respective digital signals; a signal processor which performs digital signal processing using each of the digital signals; a monitor which monitors a quality of a receiving signal with reference to information obtained through the digital signal processing; and a controller which controls, on the basis of the result of the monitoring by the monitor, a power ratio between the input light and the local light that are to be mixed with each other.

(2) According to another aspect of the invention, a method for optical reception including: mixing input light and local light to thereby obtain in-phase signal light and quadrature-phase signal light; converting the in-phase signal light and the quadrature-phase signal light into respective analog electric signals; converting the analog electric signals into respective digital signals; performing digital signal processing using each of the digital signals; monitoring a quality of a receiving signal with reference to information obtained through the digital signal processing; and controlling, on the basis of the result of the monitoring, a power ratio between the input light and the local light that are to be mixed with each other.

The technique disclosed herein can set the power ratio between the signal light power and the local light power to be at least within a predetermined range, so that the quality of receiving signals can be maintained to be fine.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, exemplary embodiments will be described with reference to accompanying drawings. The following exemplary embodiments are merely examples and do not intend to exclude various modifications and variations to the proposed method and/or apparatus that are not specifically described herein. Rather, various modifications or variations may be made to the embodiments (for example, by combining the exemplary embodiments) without departing from the scope and spirit of the proposed method and/or apparatus.

Figure 1:
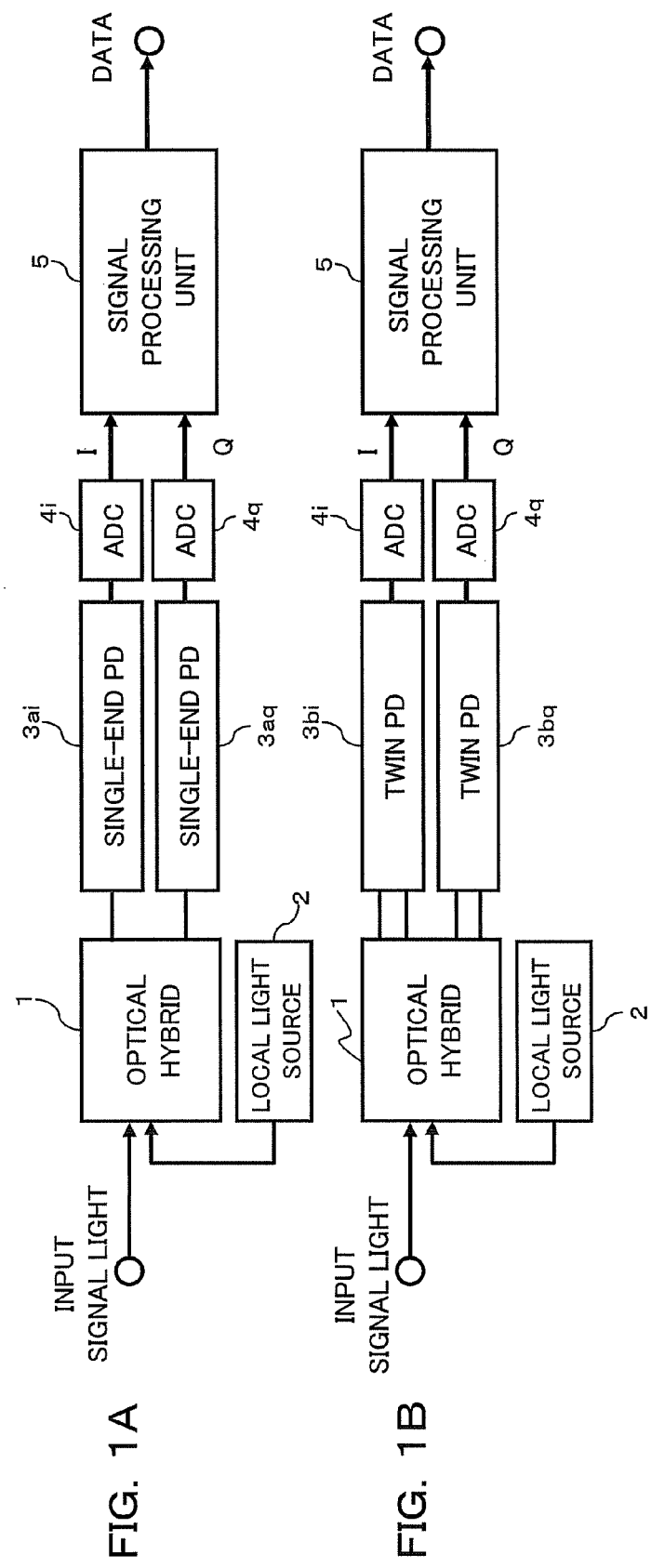
FIGS. 1A and 1B are diagrams each illustrating an example of the configuration of an optical receiver adopting a digital coherent reception scheme.

[A] Relationship Between the Power Ratio of Signal Light and Local Light and the Signal Quality FIGS. 1A and 1B are diagrams each illustrating an example of the configuration of an optical receiver adopting a digital coherent reception scheme; FIG. 1A uses single-end photodiodes as light receiving devices and FIG. 1B uses twin-photodiodes as light receiving devices.

Here, an optical hybrid 1 in FIG. 1A or 1B introduces a light signal, as input signal light, propagated through an optical transmission path into the optical receivers and mixes the light signal with local light emitted from a local light source 2 to thereby obtain in-phase signal light I and quadrature-phase signal light Q. Light receiving devices 3ai, 3aq, 3bi, and 3bq each convert signal light obtained in the optical hybrid 1 into an electric signal (analog electric signal) corresponding to the amplitude of the received signal light.

For example, the light receiving devices 3ai and 3aq receive in-phase signal light I and quadrature-phase signal light Q, respectively, in single-end photodiodes, which, if current signals corresponding to the amplitude of the received signal light are to be output, convert the in-phase signal light I and the quadrature-phase signal light Q, respectively, into voltage signals in a Transimpedance Amplifier (TIA) and outputs the signals to ADCs 4i and 4q, respectively. These analog voltage signals can be differential signals.

The light receiving devices 3bi and 3bq receive in-phase signal light I and quadrature-phase signal light Q, respectively, in twin photodiodes. Also in this case, the in-phase signal light I and the quadrature-phase signal light Q are converted into voltage signals in an TIA and are output, in the form of differential signals, to the ADCs 4l and 4q, respectively.

Each of the light receiving devices 3ai, 3aq, 3bi, and 3bq can have an Automatic Gain Control (AGC) amplifier and optimize the level of an analog electric signal to be output to the ADC 4i or 4q.

The light receiving devices 3ai and 3aq adopting single-end photodiodes each receive a one-output signal light for each channel from the optical hybrid 1 while the light receiving devices 3bi and 3bq adopting twin-photodiodes each receive a two-output (differential output) signal light for each channel from the optical hybrid 1. Either case can provide the light receiving devices 3ai and 3bi for the channel of in-phase signal light I and the light receiving devices 3aq and 3bq for the channel of quadrature-phase signal light Q.

Furthermore, the analog-to-digital converters (ADCs) 4ai and 4aq illustrated in FIG. 1A respectively convert analog electric signals of the in-phase signal I and the quadrature-phase signal Q respectively from the light receiving devices 3ai and 3aq into digital signals. In the same manner, the analog-to-digital converters (ADCs) 4bi and 4bq illustrated in FIG. 1B respectively convert in-phase signal I and quadrature-phase signal Q respectively from the light receiving devices 3bi and 3bq into digital signals.

A signal processing unit 5 carries out digital signal processing through the use of the in-phase signal I and the quadrature-phase signal Q from the ADCs 4 (the ADCs 4ai and 4aq in FIG. 1A and the ADCs 4bi and 4bq in FIG. 1B). Specifically, the signal processing unit 5 performs waveform equalizing processing and decoding processing using digital signals from the ADCs 4. For example, waveform equalizing processing can compensate for chromatic dispersion caused during propagation through the optical transmission path and decoding processing can demodulate data modulated at the transmitter end. The signal processing unit 5 may be realized by, for example, a DSP, but can alternatively be realized by hardware, firmware, or software.

Here, adoption of the single-end photodiodes 3ai and 3aq as the light receiving devices (see FIG. 1A) has advantages of reduction in cost and size of the apparatus and others as compared with adoption of the twin photodiodes 3bi and 3bq. In the cases where the single-end photodiodes 3ai and 3aq are used, noise components, such as a square-low detection component and Relative Intensity Noise (RIN), represented by the terms of the following Formula (1) remains in a received electric signal.

Formula (1) is an example of the formula to derive the light power $P_I$ of in-phase signal light I received by the single-end photodiode 3ai. Here, the symbol S represents an electric-field component of signal light; the symbol L represents an electric-field component of local light; and the superscript mark * represents a phase conjugate. Referring to the symbols n and $n_L$, the symbol $n^2$ represents an Amplified Spontaneous Emission (ASE) noise power and the symbol $n_L^2$ represents a noise power of RIN.

$$P_I = (SL^* + S^*L) + |S|^2 + (S+L)n^* + (S+L)^*n + (Ln_L^* + L^*n_L) \quad (1)$$

In Formula (I), the first term $(SL^*+S^*L)$ and the second term $|S|^2$ represent an information component and the square-low detection component, respectively and $(S+L)n^*+(S+L)*n$ and $(Ln_L^*+L^*n_L)$ represent the ASE noise component and RIN, respectively.

As understood from Formula (1), the square-low detection component is originated from the signal light component. As increasing signal light power, the square-low detection component comes to have a larger influence as a noise component. In the meantime, the RIN is originated from the local light component. As increasing local light power, the RIN comes to have a larger influence as a noise component.

Figure 2:
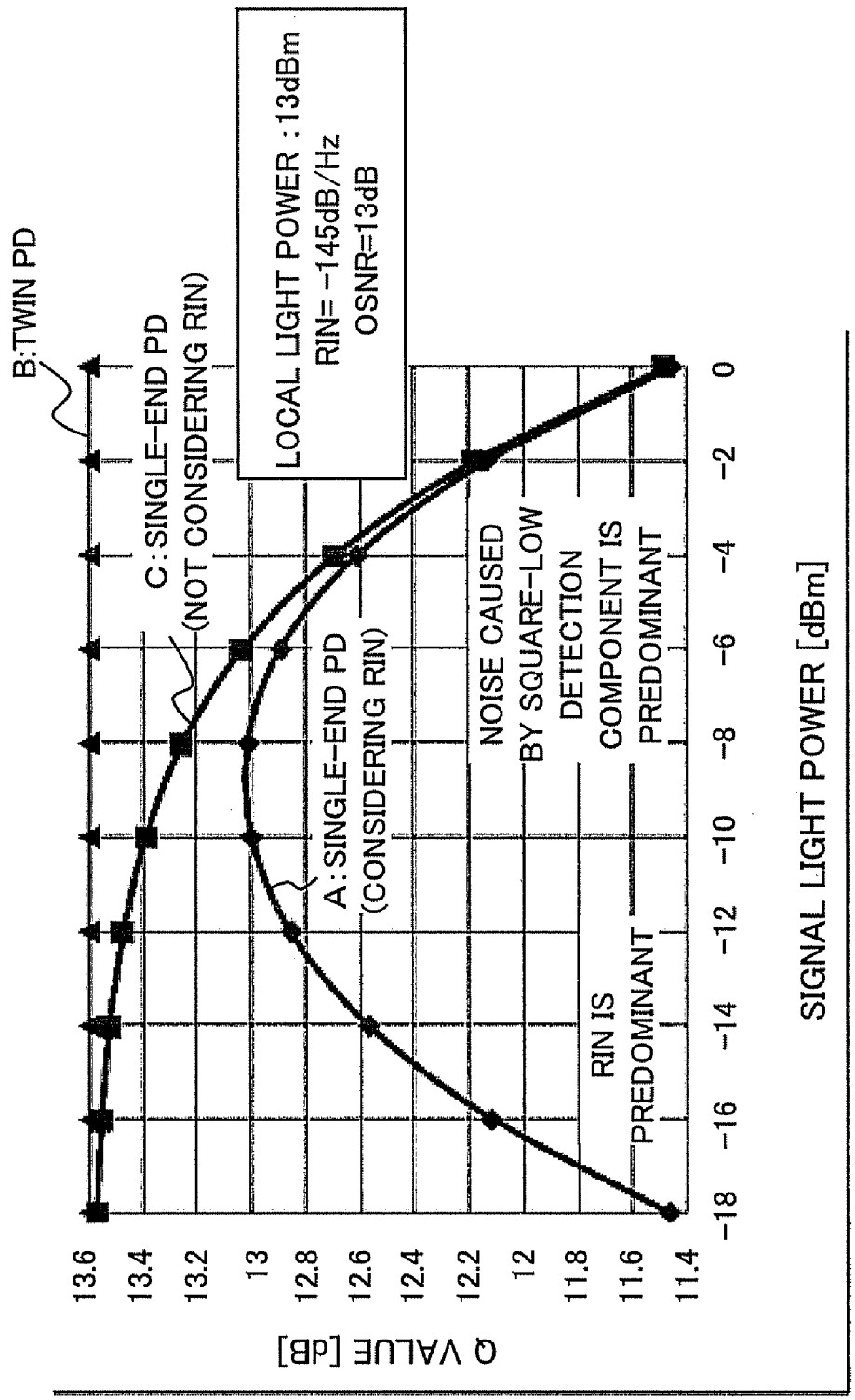
FIG. 2 is a diagram denoting simulation result for the Q values of receiving signals to be subjected to data demodulation under a condition of varying the signal light while local light power is kept to be constant.

FIG. 2 is a diagram denoting simulation results for the Q values of the receiving signal to be subjected to data demodulation under a condition of varying the signal light power while the local light power is kept to be constant, the results depending on the type of photodiode to be adopted. In FIG. 2, the plot A represents the simulation result of a case where the single-end photodiodes are adopted (see FIG. 1A) and the plot B represents the simulation result of a case where the twin photodiodes are adopted (see FIG. 1B). The plot C represents the simulation result of a case where single-end photodiodes are adopted but the influence caused by RIN is not considered.

In adoption of single-end photodiodes, RIN is predominant as the noise component when the signal light power is relatively low as the plot A in FIG. 2 denotes, so that the Q value is a relatively low value. In accordance with increase in signal light power, the influence of the RIN is less significant and the Q value increases. Further, increase in signal light power, RIN has a relatively low influence but the square-low detection component becomes predominant as the noise component so that the Q value declines.

Accordingly, one of the conditions to optimize the Q value of a receiving signal is to set the power ratio between the signal light and the local light at least in a predetermined range.

In adoption of twin photodiodes, the square-low detection component and the RIN component are theoretically cancelled out each other when light receiving. For the above, the influence due to the noise component is relatively low as compared with a case of adoption of single-end photodiodes, and therefore the simulation for the Q value results in fine values regardless of the power ratio between the signal light and the local light as the plot B of FIG. 2 denotes.

However, even in adoption of twin photodiodes, the square-low detection component and the RIN are not always cancelled out each other because variation in losses of ports of the optical hybrid 1 and variation in sensitivities between differential of each twin photodiode may have the influence. Also in this case, a property difference of a factor in the receiving mechanisms causes the signal light and the local light to have an optimum power ratio even in adoption of twin photodiodes.

As detailed above, even when twin photodiodes are used, the optimization of the Q value of the receiving signal even when twin photodiodes needs to set the power ratio between the signal light power and the local light power at least within a predetermined range, as one of the conditions of the optimization.

Recently, there has been used a polarization multiplexing scheme, in which different two polarization components are regarded as elements to be multiplexed for optical modulation, as one of the schemes to realize the large scale transmission. In adoption of the polarization multiplexing scheme, one of the conditions to optimize the Q value of a receiving signal is to set the ratio between the signal light power and the local power ratio needs to nestle at least within a predetermined range similarly to the above cases. The same is applied to either case of using single-end photodiodes and twin photodiodes.

(B) First Embodiment

Figure 3:
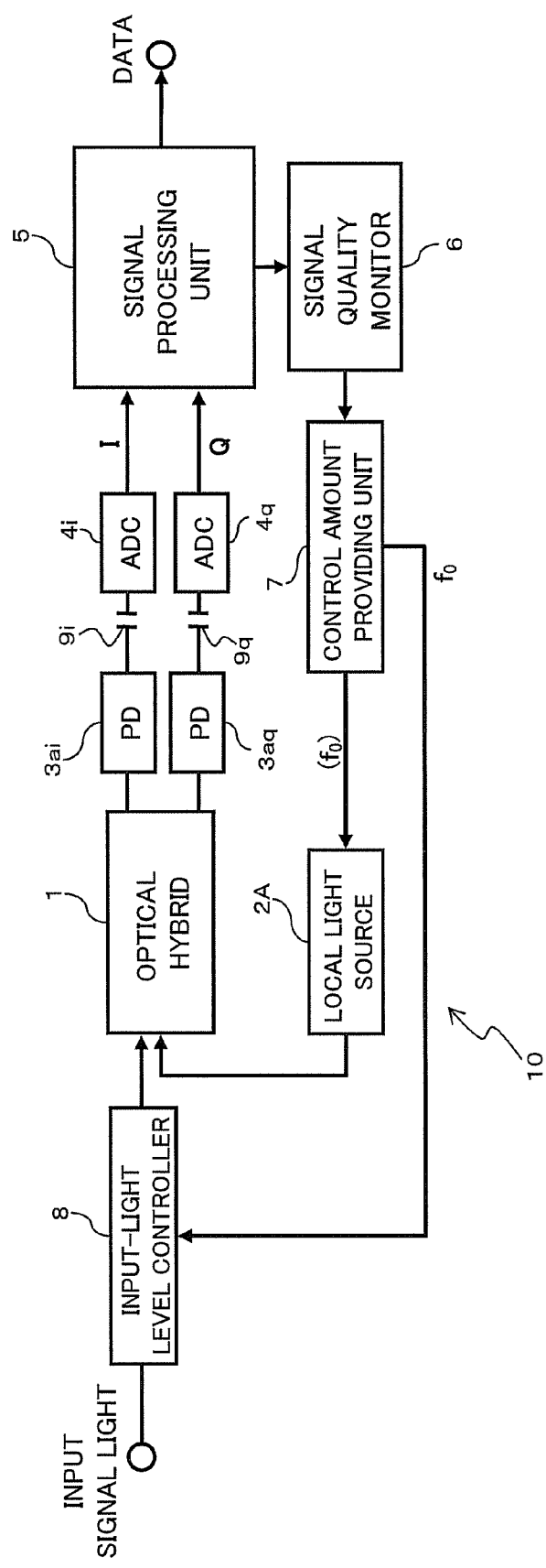
FIG. 3 is a block diagram schematically illustrating the configuration of a first embodiment.

With the above in view, the optical receiver 10 of a first embodiment illustrated in FIG. 3 maintains the optimum power ratio between the signal light power and the local light power. The optical receiver 10 of FIG. 3 includes a signal quality monitor 6, a controlling amount providing unit 7, an input light level controller 8, and a local light source 2A in addition to the optical hybrid 1, the light receivers 3$ai$ and 3$aq$, the ADCs 4$i$ and 4$q$, and the signal processing unit 5 that are same as those illustrated in FIG. 1A. Reference numbers 9$i$ and 9$q$ represent AC couplers, such as capacitors, interposed between the light receiving device 3$ai$ and the ADC 4$i$ and between the light receiving device 3$aq$ and the ADC 4$q$, respectively.

The input light level controller 8 controls the level of the light signal to be introduced into the optical hybrid 1, that is, the level of the light signal propagated through the optical transmission path, under the control the controlling amount providing unit 7 to be detailed below. The input light level controller 8 is realized by, for example, a Variable Optical Attenuator (VOA) capable of varying the amount of attenuation with an amount of controlling received.

The local light source 2A emits local light for receiving coherent light. The level of the local light to be output to the optical hybrid 1 is controlled under the control of the controlling amount providing unit 7.

The optical hybrid 1 mixes the light signal having a level controlled by the input light level controller 8 and the local light having a level controlled by the local light source 2A with each other and thereby obtains in-phase signal light I and quadrature-phase light Q. Namely, the optical hybrid 1 is an example of a mixer which mixes the input light and the local light to thereby obtain the in-phase signal light and the quadrature-phase signal light.

In this case, the optical hybrid 1 mixes the input light and each of the local lights having the phase difference of approximately 90 degrees with each other and outputs the in-phase signal light and the quadrature-phase signal light. In the first embodiment, the in-phase signal light and the quadrature-phase signal light can be each regarded as a single output.

The signal quality monitor 6 is an example of a monitor which monitors a quality of a receiving signal with reference to information obtained through digital signal processing performed in the signal processing unit 5. The signal quality monitor 6 uses the number of detected errors, the number of corrected errors and/or electric-field values of the receiving signal which values are input from the ADCs 4$i$ and 4$q$ into the signal processing unit 5 as information for monitoring quality of the receiving signal.

The number of detected errors and the number of corrected errors can be regarded as indexes of the quality of the receiving signal. For example, these numbers being large mean that the quality of a receiving signal is poor while these numbers being small mean that the quality of the receiving signal is rich. In this case, the signal quality monitor 6 outputs signal quality monitoring values each corresponding to one of the number of detected errors and the number of corrected errors that are received from the signal processing unit 5.

The controlling amount providing unit 7 provides the input light level controller 8 and the local light source 2A with amounts of controlling based on the result of monitoring by the signal quality monitor 6, so that the power ratio between the input light and the local light that are to be introduced into the optical hybrid 1 and be mixed with each other.

In other words, the input light level controller 8 is an example of an input-light level controller which controls the level of input light to be input into the optical hybrid 1, and the local light source 2A is an example of a local-light level controller which controls the level of the local light to be input into the optical hybrid 1. The input light level controller 8, the local light source 2A, and the controlling amount providing unit 7 cooperate to function as a controller which controls the power ratio between the input light and the local light to be mixed with each other on the basis of the result of monitoring by the signal quality monitor 6.

Figure 4:
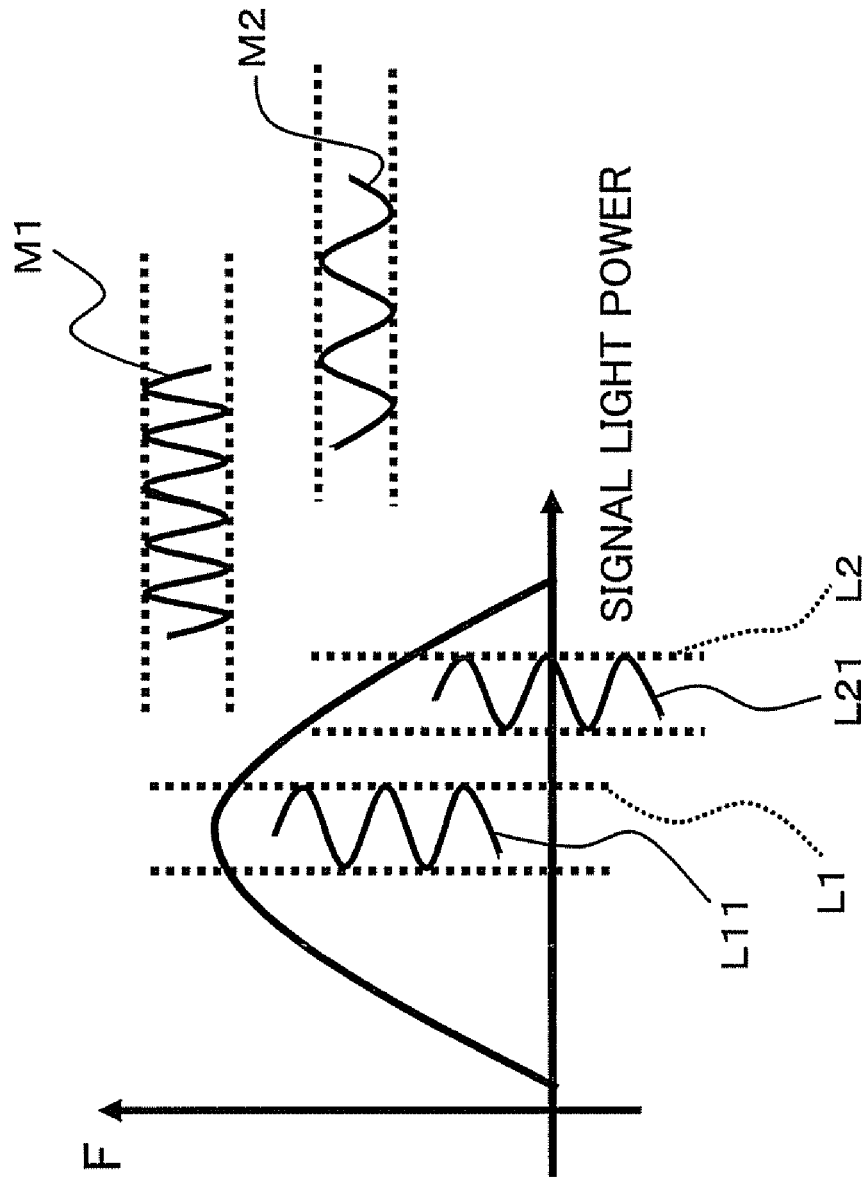
FIG. 4 is a diagram illustrating an operation of the first embodiment.

FIG. 4 is a diagram denoting an example of control of the controlling amount providing unit 7 over the power ratio. As denoted by L11 and L21 in FIG. 4, the level of the signal light to be input into the optical hybrid 1 is dithered by frequency f0 through the use of the amount of controlling to be provided to the input light level controller 8. In the meantime, the level of the local light to be input into the optical hybrid 1 is kept to be constant through the use of the amount of controlling to be provided to the local light source 2A.

The signal light that is dithered as the above and the local light are mixed in the optical hybrid 1, which outputs in-phase signal light I and quadrature signal light Q to the light receiving devices 3ai and 3aq, respectively. The light receiving devices 3ai and 3aq O/E convert the in-phase signal light I and the quadrature signal light Q from the optical hybrid 1, respectively. The ADCs 4i and 4q convert the analog electric signal obtained through the O/E conversion into digital signals and outputs the digital signals to the signal processing unit 5.

The light receiving devices 3ai and 3aq use respective amplifiers that are components thereof to control the levels of the analog electric signal to be input into ADCs 4i and 4q respectively to be constant. The frequency f0 for dithering is set to be one (e.g., one sufficiently lower than the frequency of the data rate) that can be discriminated from the data rate frequency. That can reflect the effect caused by the dithering on the level of the signal light into a monitoring value obtained by the signal quality monitor 6.

For the light signal, the amplitude to be dithered by the input light level controller 8 is set to be one sufficiently smaller than the amplitude possessed by the signal light itself so that data demodulation subsequently performed in the signal processing unit 5 is not affected.

The signal quality monitor 6 monitors the quality of a signal using the information from the signal processing unit 5. The result of monitoring the signal quality fluctuates with the characteristics denoted the plot A in FIG. 2 accompanied by dithering of the level of the signal light.

Specifically, when the input light level controller 8 adds dither of frequency f0 to the input signal light, the level of the signal light comes to have fluctuation components L11 and L21 at frequency f0 associated with the signal light levels L1 and L2 to be input into the input light level controller 8, respectively.

A value as the result of the monitoring by the signal quality monitor 6 has a variation in quality index influenced by dithering the level of the signal light. Specifically, when the level of the signal light to be input into the optical hybrid 1 fluctuates as denoted by L21 at frequency f0, value M2 obtained as the result of monitoring by the signal quality monitor 6 also fluctuates at frequency f0. The fluctuation L21 of the level of the signal light is caused by fluctuation in influence of the squared-low detection component denoted in FIG. 2 within a relatively large region.

Conversely, when the level of the signal light to be input into the optical hybrid 1 fluctuates as denoted by L11 at frequency f0, value M1 obtained as the result of the motoring by the signal quality monitor 6 fluctuates at frequency 2f0. The fluctuation L11 in level of the signal light is caused by fluctuation in an influence of the square-low detection component and the RIN within a relatively small region.

Accordingly, the controlling amount providing unit 7 controls the amplitude of the signal light with the intention that the component of frequency f0 contained in the values of the result of the monitoring by the signal quality monitor 6 comes to be the minimum or the component of frequency 2f0 comes to be the maximum. In the case of FIG. 4, the controlling amount providing unit 7 provides the input light level controller 8 with an amount of controlling, with the intention that the amplitude of the signal light comes to be approximately L1.

In the above example, the level of the signal light is dithered under the control of the input light level controller 8. Alternatively, the level of the local light emitted from the local light source 2A may be dithered.

Figure 5:
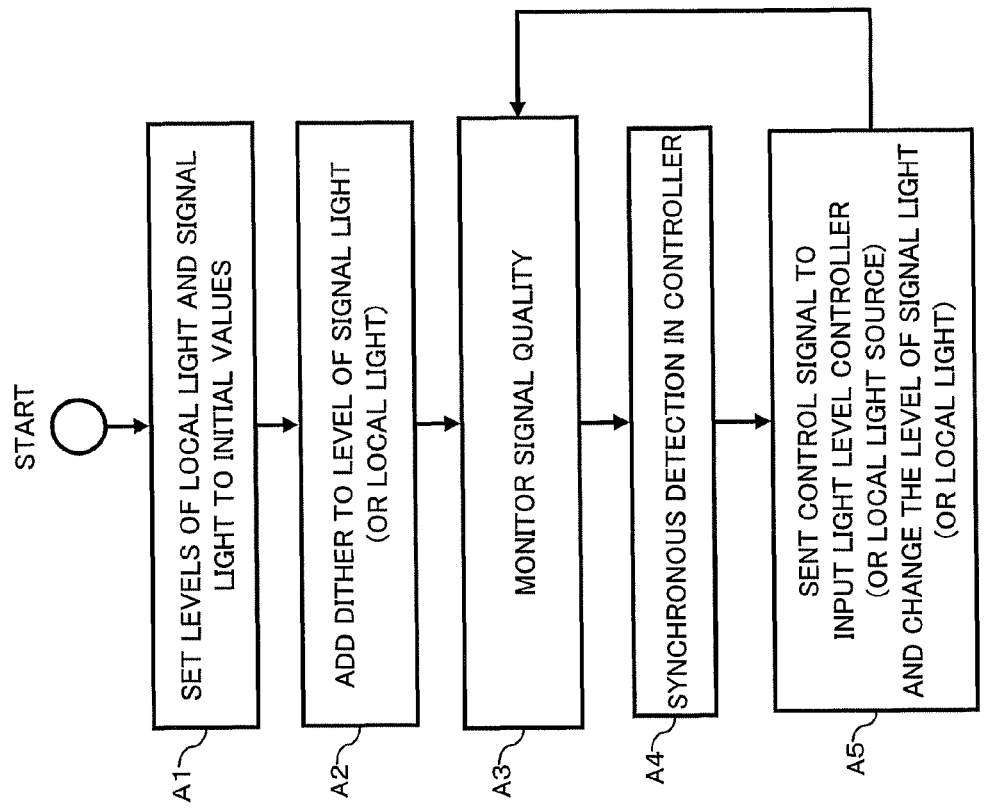
FIG. 5 is a flow diagram illustrating a succession of procedural steps of an operation of the first embodiment.

Description will now be made in relation to the operation performed by the optical receiver 10 having the above configuration with reference to FIG. 5. The input light level controller 8 sets the levels of the signal light input through the optical transmission path and the local light to the initial values (step A1). Here, the controlling amount providing unit 7 can provide control information to set the level to the initial value to the input light level controller 8.

Then the input light level controller 8 adds dither of frequency f0 to the level of the input signal light with reference to the amount of controlling provided by the controlling amount providing unit 7 (step A2). The signal quality monitor 6 receives information of the number of corrected errors and the number of detected errors from the signal processing unit 5, and outputs signal quality monitoring value (step A3).

The controlling amount providing unit 7 extracts the component of frequency f0 (or frequency 2f0) from in the monitoring value output from the signal quality monitor 6 through, for example, synchronous detection (step A4), and controls the level of the signal light through the control on the input light level controller 8 with the intention that the extracted frequency-f0 component comes to be the minimum. Otherwise, the controlling amount providing unit 7 controls the level of the signal light with the intention that the extracted frequency-2f0 components come to be the maximum (step A3 through step A5). Alternatively, the control may be carried out over the local light source 2A so that the level of the local light is controlled as described above.

Figure 6:
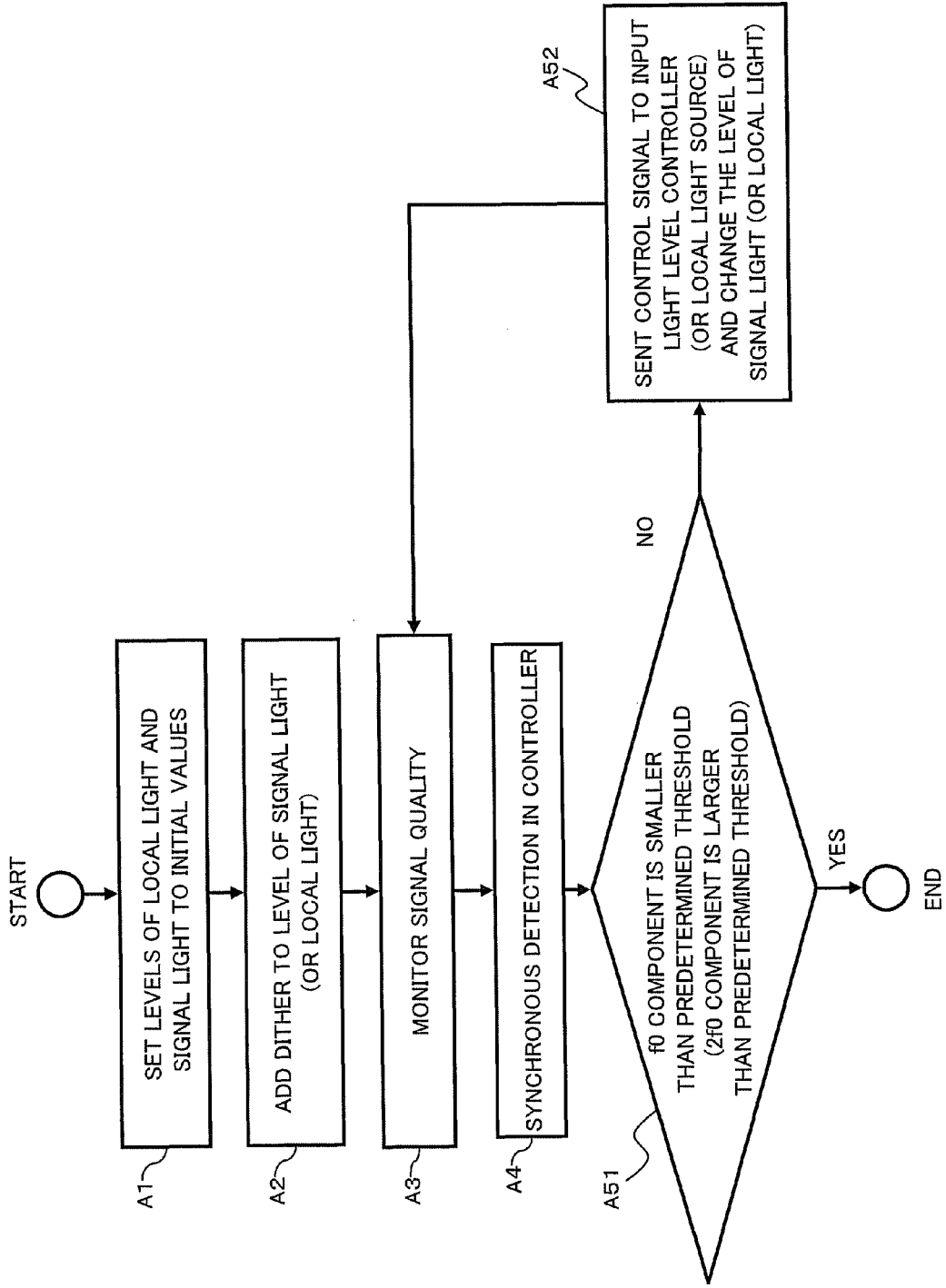
FIG. 6 is a flow diagram illustrating a succession of procedural steps of an operation of the first embodiment.

As illustrated in FIG. 6, the controlling amount providing unit 7 may continue to control the level of the signal light until the extracted frequency-f0 component becomes lower than a predetermined threshold (or until the extracted frequency-2f0 component becomes larger than a predetermined threshold), that is, until the threshold condition is satisfied (from NO route of step A51 via step A52 to step A3). In this case, the control over the level of the signal light is terminated when the above threshold condition is satisfied (YES route in step A51).

The thresholds in the first embodiment can be used as a criterion to judge whether or not the signal quality falls within a range that satisfies a predetermined standard. After that, the controlling amount providing unit 7 can control the above power ratio at regular or irregular intervals.

Since the first embodiment can set the power ratio between the power of signal light power and the local light power to fall at least within a predetermined range, the signal quality of the receiving signal can advantageously be maintained in a fine state.

[B1] Modification

The signal quality monitor 6 of the first embodiment can derive a value serving as an index of the quality of the receiving signal in the following manner through the use of, as a substitute for the number of corrected errors and the number of detected errors, the information of the electric-field values of the receiving signal which values are input into the signal processing unit 5 from the ADCs 4i and 4q.

The signal quality monitor 6 accumulates information of electric-field values of a predetermined number of receiving signals sampled, and calculates the average of the accumulated electric-field values of the sampled receiving signals, that is the average power $\mu$ of the receiving signals, and additionally calculates the standard deviation $\sigma$ of the electric-field value of the receiving signals. The ratio F of $\mu$ to $\sigma$ (=$\mu/\sigma$) calculated as the above can be used as the index of the quality of receiving signals.

Figure 7:
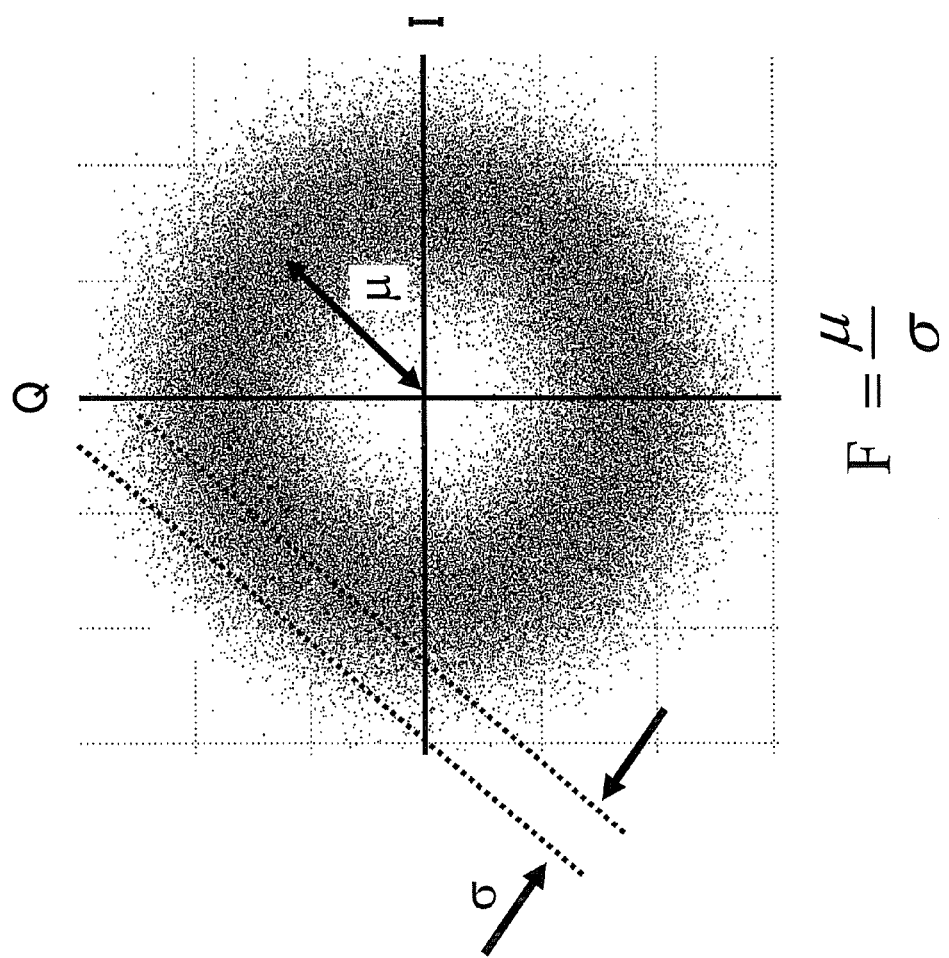
FIG. 7 is a diagram denoting a modification to the first embodiment.

FIG. 7 is a diagram schematically denoting the quality index value F. Namely, FIG. 7 denotes the distribution of electric field data obtained in a predetermined time period after being subjected to waveform equalizing processing. Here, since data provided to the signal quality monitor 6 is not subjected to phase synchronization, the signal points on the constellation of FIG. 7 equally covers the entire phase at substantially constant amplitude.

Figure 8:
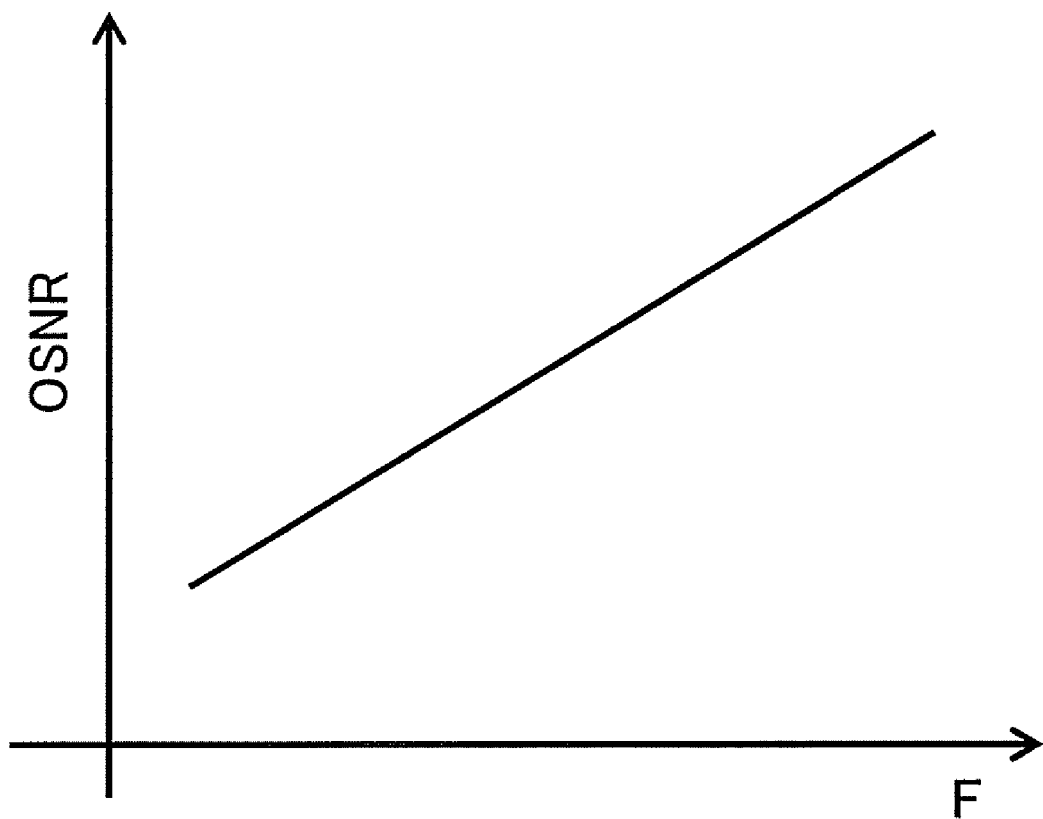
FIG. 8 is a diagram denoting a modification to the first embodiment.

The ratio F can be associated with an Optical Signal Noise Ratio (OSNR) as denoted in example FIG. 8, and can be therefore used as the index of the quality of receiving signals to control the power ratio in the controlling amount providing unit 7.

[C] Second Embodiment

Figure 9:
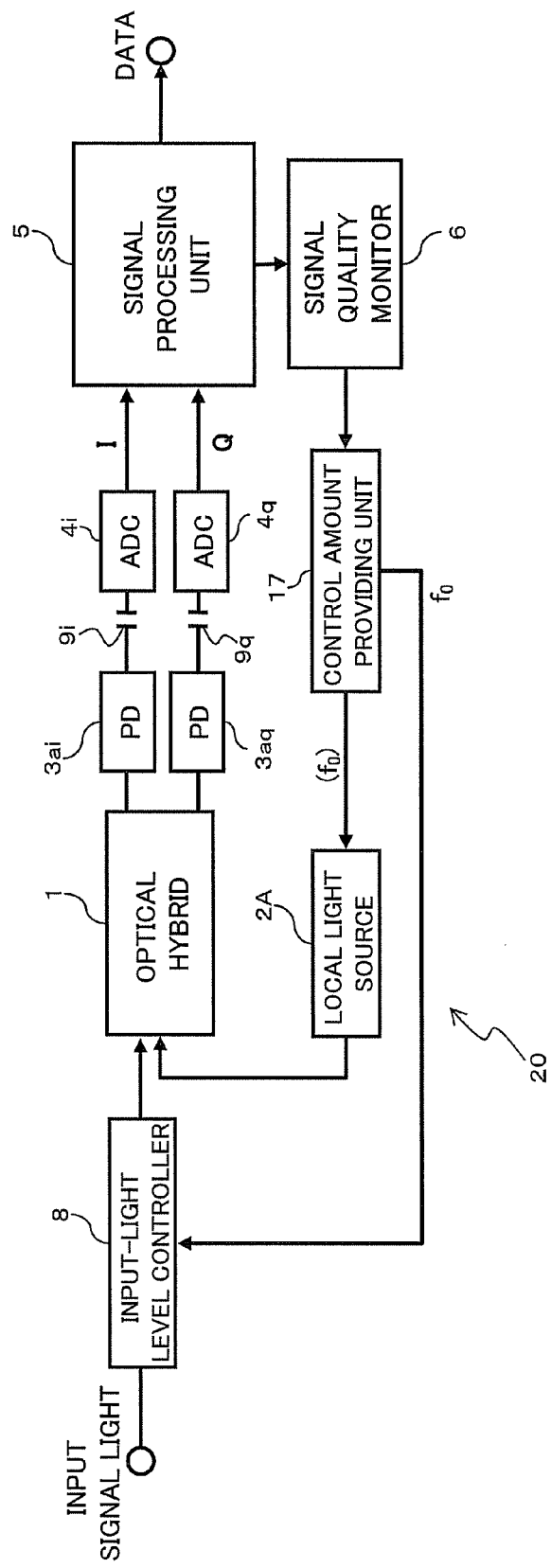
FIG. 9 is a block diagram schematically illustrating the configuration of a second embodiment.

FIG. 9 is a block diagram schematically illustrating the second embodiment. The optical receiver 20 of FIG. 9 includes a controlling amount providing unit 17, which is different from the controlling amount providing unit 7 of the first embodiment, but the remaining configuration thereof is basically the same as that of the optical receiver 10 illustrated in FIG. 3. In FIG. 9, parts and elements represented by reference numbers the same as those in FIG. 3 are the substantially same parts and elements as those of FIG. 3.

Here, the controlling amount providing unit 17 controls the power ratio between the signal light and the local light on the basis of the result of monitoring by the signal quality monitor 6 in the same manner as the first embodiment, and controls the amplitudes of the signal light and the local light, maintaining the power ratio being thus controlled.

The ADCs 4i and 4q have right ranges of amplitudes that are to be sampled. In other words, when an electric-intensity modulated signal is input which has an amplitude value exceeding the limit of the range, the ADCs 4i and 4q have a difficulty in sampling which maintains a fine quality of receiving signals. However, the second embodiment can optimize the input level into the ADCs 4i and 4q because the amplitudes of the signal light and the local light can be controlled while having a constant power ratio.

Figure 10:
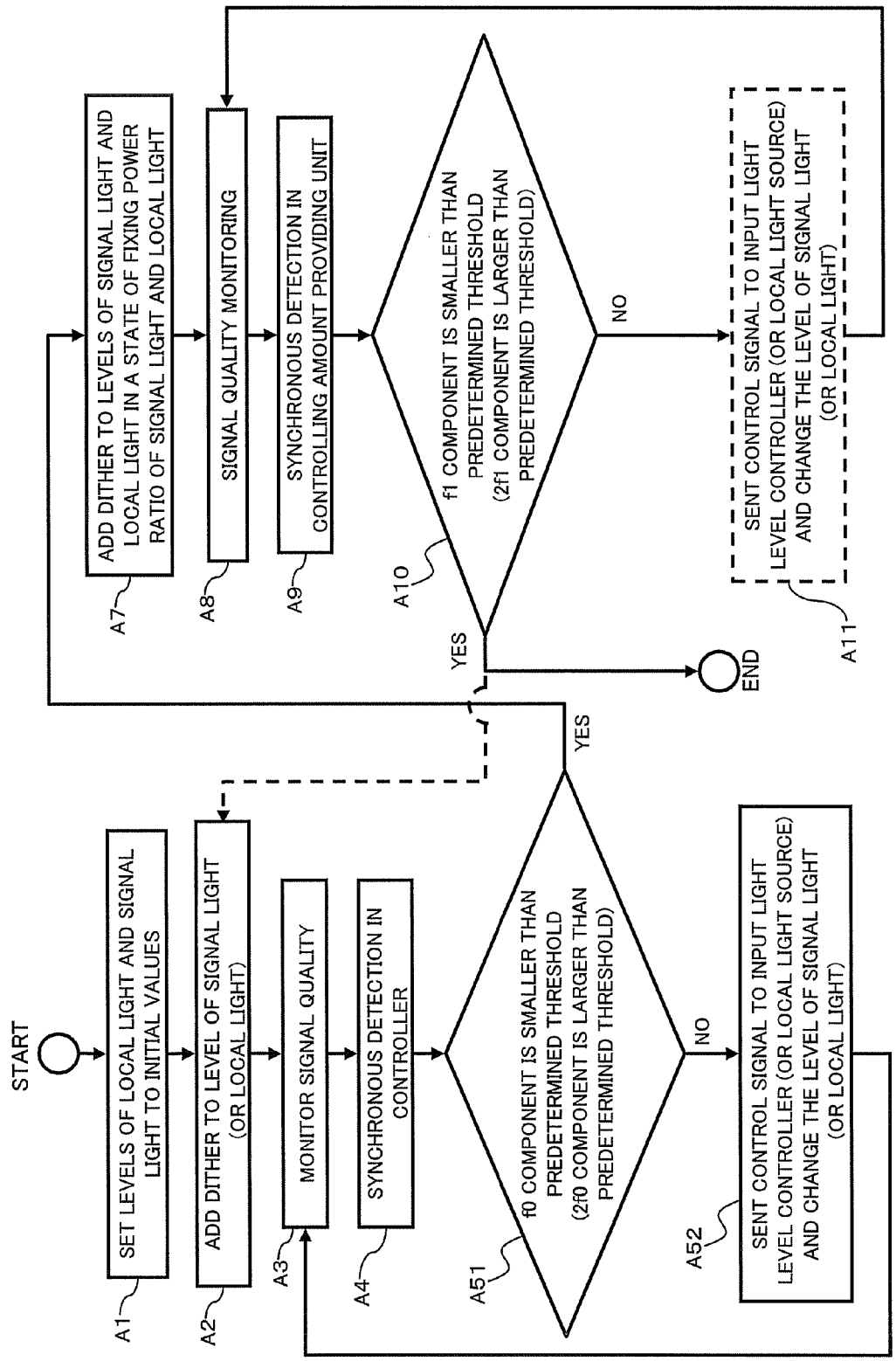
FIG. 10 is a flow diagram illustrating a succession of procedural steps of an operation of the second embodiment.

FIG. 10 is a flow diagram illustrating an example of the operation of the optical receiver 20 of the second embodiment. To begin with, the controlling amount providing unit 17 controls the power ratio between the signal light and the local light (steps A1 through A4, and steps A51 and A52) in the same manner as the first embodiment (see FIG. 6). Specifically, the controlling amount providing unit 17 continues control of the level of the signal light until the extracted frequency-f0 component comes to be smaller than a predetermined threshold value (or the 2f0 component comes to be larger than a predetermined threshold value), that is, until the threshold condition is satisfied (from NO route in step A51 via step A52 to step A3).

Then, when the value representing the result of monitoring by the signal quality monitor 6 satisfies the threshold condition, the controlling amount providing unit 17 controls the levels of both signal light and local light, maintaining the above power ratio (from YES route in step A51 to steps A7 through A11). That can optimize the levels of electric signals that are to be input into the ADCs 4i and 4q.

Under a state of fixing the power ratio between the signal light and the local light, dither of frequency f1 is added to the levels of the signal light and the local light. For this, the controlling amount providing unit 17 outputs control signals to the input light level controller 8 and the local light source 2A (step A7). Frequency f1 may be the same as or different from frequency f0.

Here, in optimization of the levels of electric signals to be input into the ADCs 4i and 4q, the effect of the dithering on the result of monitoring can be presumed to be canceled by AGC amplifiers included as elements in the light receiving devices 3ai and 3aq and/or the function of the normalization performed inside the signal processing unit 5.

In this case, dither is added to both signal light and local light, taking one or any combination of the following counter measurements (1) through (4):

(1) temporarily halting gain control by the AGC amplifiers included in the light receiving devices 3ai and 3aq;

(2) temporarily halting the function for normalization inside the signal processing unit 5;

(3) using a frequency not responding to the gain control by the AGC amplifiers as frequency f1 for dithering and for example, using a frequency sufficient low or high as compared with the responding speed of the AGC amplifier; and (4) using a frequency to which the circuit in the DSP that realizes the normalization inside the signal processing unit 5 does not respond as frequency f1 for dithering.

The signal quality monitor 6 outputs signal quality monitoring values obtained through adding dither of the above frequency f1 to the levels of the signal light and the local light that are to be input into the optical hybrid 1 (step A8).

The controlling amount providing unit 17 extracts a frequency-f1 component (or a frequency-2f1 component) contained in the monitoring values obtained as the result of monitoring by the signal quality monitor 6 through, for example, synchronous detection (step A9). The controlling amount providing unit 17 continues the control of the levels of the signal light and the local light until the extracted frequency-f1 component comes to be smaller than a predetermined threshold value (or the frequency-2f1 component comes to be larger than a predetermined threshold), that is, until the threshold condition is satisfied (from NO route in step A10 to step A8 via step A11). The thresholds here can be regarded as a value that represents that the quality of a signal comes to be higher than that of judgment threshold used when controlling of the power ratio.

After that, when the threshold condition is satisfied, the control of the levels of the signal light and the local light is halted (YES route in step A10). Alternatively, when the threshold condition is satisfied, the control of the level ratio between the signal light and the local light may be resumed (the dotted-line route from YES route in step A10 to step A2).

Consequently, the second embodiment can nestle the power ratio between the signal light power and the local light power at least within a constant range so that the quality of receiving signals can be advantageously maintained to be fine.

Furthermore, the amplitudes of the signal light and the local light can also be optimized to contribute to further improvement in quality of the receiving signals.

(D) Third Embodiment

Figure 11:
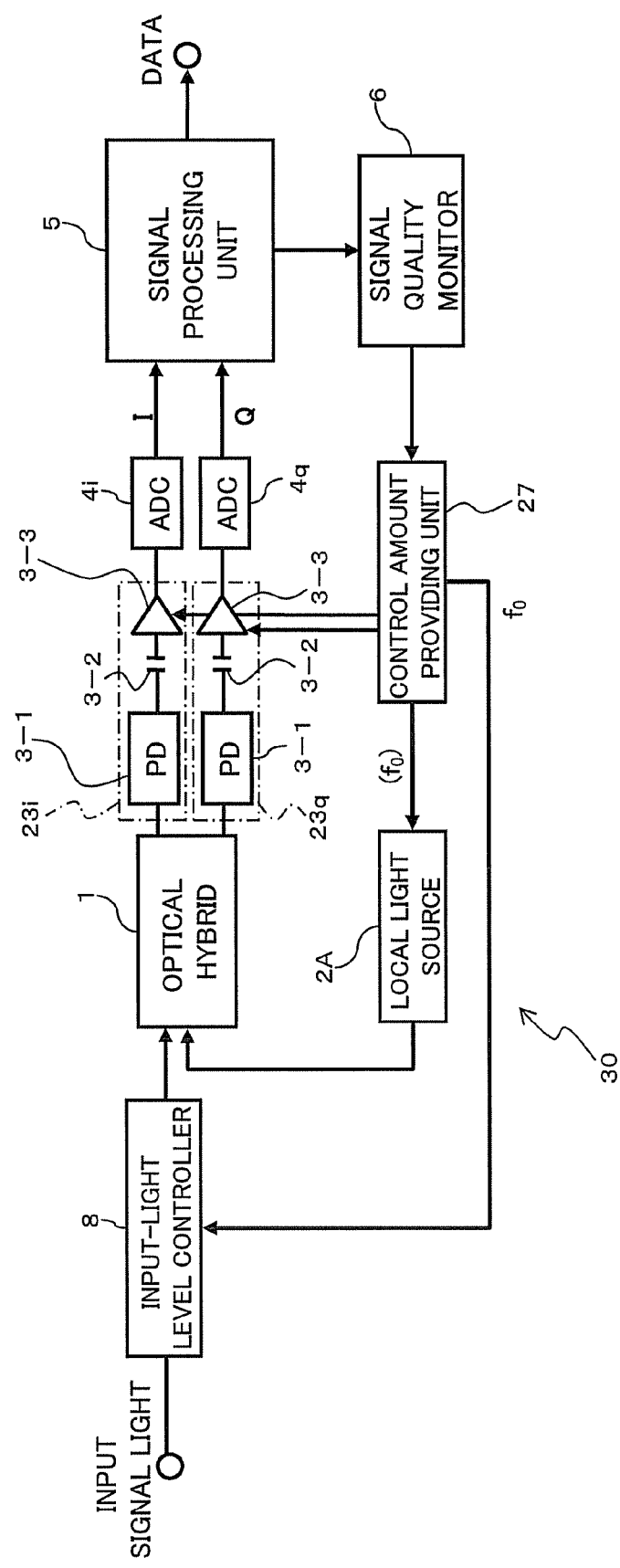
FIG. 11 is a block diagram schematically illustrating the configuration of a third embodiment.

FIG. 11 is a block diagram schematically illustrating the third embodiment. The optical receiver 30 illustrated in FIG. 11 includes a controlling amount providing unit 27, which is different from the controlling amount providing unit 17 of the second embodiment. The optical receiver 30 of the third embodiment includes light receiving devices 23i and 23q each of which includes a single-end photodiode 3-1, an AC coupler 3-2, and an amplifier 3-3.

The single-end photodiodes 3-1 each receive output light from one of channels of the optical hybrid 1 and output an electric signal having an amplitude corresponding to the amount of light received. The AC couplers 3-2 each remove the DC component from the electric signal that the corresponding single-end photodiode 3-1 outputs.

The amplifiers 3-3 each amplify the electric signal whose DC component is removed by the AC coupler 3-2 and output the amplified electric signal to corresponding one of the ADCs 4i and 4q. Each amplifier 3-3 carries out gain control with the intention that the electric signal that is to be output to the corresponding ADC 4i or 4q is optimized for sampling in the corresponding ADC. Alternatively, each AC coupler 3-2 may be disposed downstream of the amplifier 3-3, i.e., between the amplifier 3-3 and the corresponding ADC 4i or 4q.

The controlling amount providing unit 27 controls gains of the respective amplifiers 3-3 included in the light receiving device 23i and 23q, maintaining the power ratio (between the signal light and the local light) that is controlled on the basis of the result of the monitoring by the signal quality monitor 6 in the same manner as the first embodiment.

Thereby, the levels of signals to be input into the ADCs 4i and 4q are controlled such that the quality of receiving signal monitored by the signal quality monitor 6 is optimized similarly to the second embodiment.

The above second embodiment controls the levels of the signal light and the local light that are to be input into the optical hybrid 1. However, the quality of receiving signal can be similarly optimized through controlling the gains of the signal level of the electric signal that is to be input into the ADC 4i or 4q at the amplifier 3-3 as performed in the third embodiment.

Figure 12:
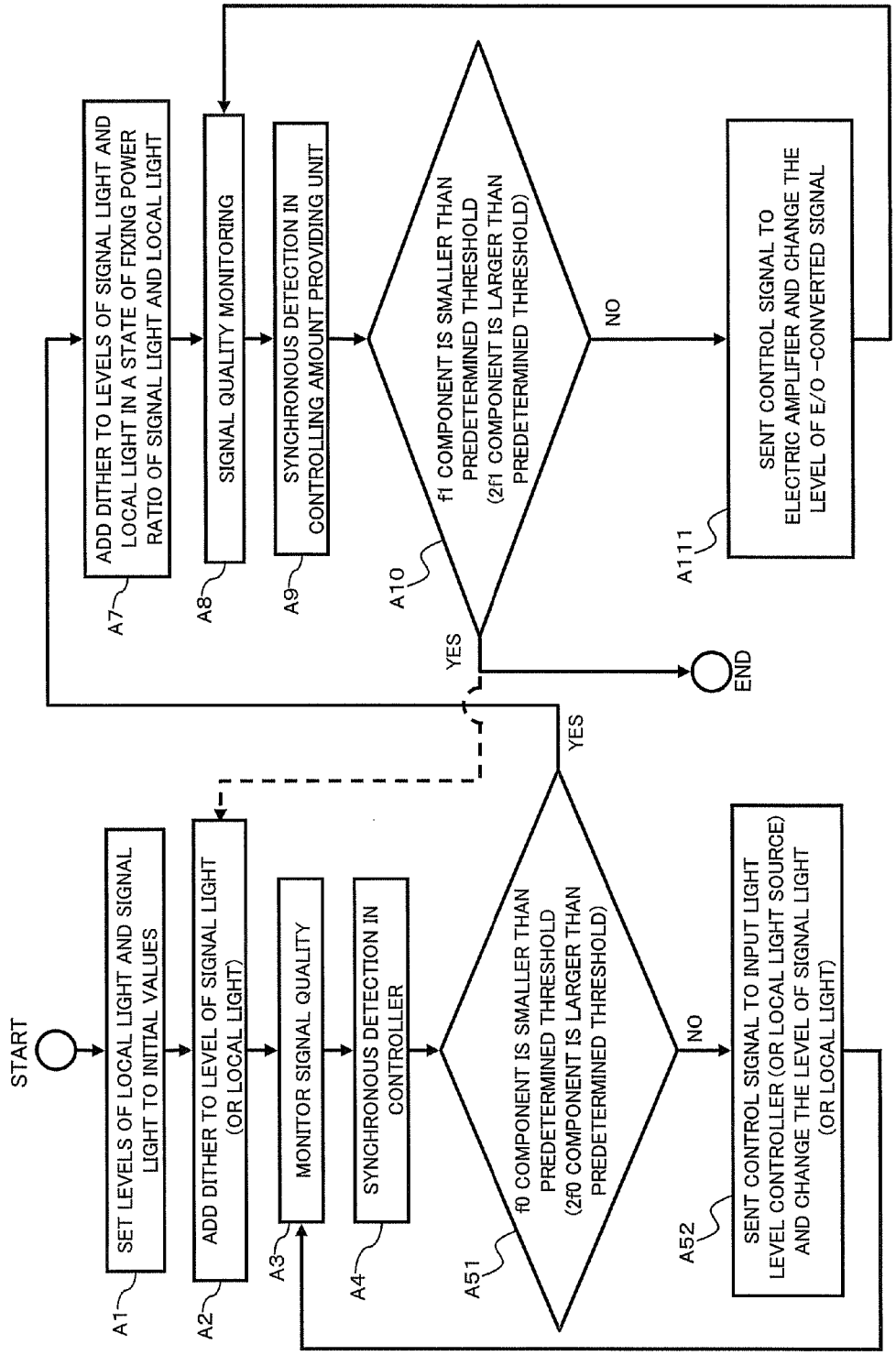
FIG. 12 is a flow diagram illustrating a succession of procedural steps of an operation of the third embodiment.

FIG. 12 is a flow diagram illustrating an example of the operation of the optical receiver 30 of the third embodiment. To begin with, the controlling amount providing unit 27 controls the power ratio between the signal light and the local light (steps A1 through A4, and steps A51 and A52) in the same manner as the flow diagrams FIGS. 3 and 9. Specifically, the controlling amount providing unit 27 continues to control the level of the signal light until the extracted frequency-f0 component comes to be smaller than a predetermined threshold value (or the 2f0 component comes to be larger than a predetermined threshold value), that is, until the threshold condition is satisfied (from NO route in step A51 via step A52 to step A3).

Then, when the above threshold condition is satisfied, the controlling amount providing unit 27 controls the levels of both signal light and local light, maintaining the above power ratio (from YES route in step A51 to steps A7 through A11, and step A111). That can optimize the levels of electric signals that are to be input into the ADCs 4i and 4q.

Under a state of fixing the power ratio between the signal light and the local light, dither of frequency f1 is added to the outputs of respective amplifiers 3-3 of the light receiving devices 23i and 23q through controlling the gains thereof. For this, the controlling amount providing unit 27 outputs a control signal to the amplifier 3-3 of each of light receiving devices 23i and 23q (step A7).

The signal quality monitor 6 outputs signal quality monitoring values obtained through adding dither of the above frequency f1 to the levels of the signal light and the local light that are to be input into the optical hybrid 1 (step A8).

The controlling amount providing unit 27 extracts a frequency-f1 component (or a frequency-2f1 component) from the values obtained as the result of monitoring by the signal quality monitor 6 through, for example, coherent detection (step A9). The controlling amount providing unit 27 continues the control of the gain of each amplifier (electric amplifier) 3-3 until the extracted frequency-f1 component comes to be smaller than a predetermined threshold value (or the frequency-2f1 component comes to be larger than a predetermined threshold), that is, until the threshold condition is satisfied (from NO route in step A10 via step A111 to step A8). The thresholds here can be regarded as values that represent that the quality of a signal comes to be higher than that of judgment threshold used when controlling of the power ratio.

After that, when the threshold condition is satisfied, the control of the gain of the amplifiers 3-3 is halted (YES route in step A10). Alternatively, when the threshold condition is satisfied, the control of the level ratio between the signal light and the local light may be resumed (the dotted-line route from YES route in step A10 to step A2).

Consequently, the third embodiment can nestle the power ratio between the signal light power and the local light power at least within a constant range so that the quality of receiving signals can be advantageously maintained to be fine.

Furthermore, the amplitudes of the electric signals to be input into the ADCs 4i and 4q can also be optimized to contribute to further improvement in quality of the receiving signals.

[E] Fourth Embodiment

Figure 13:
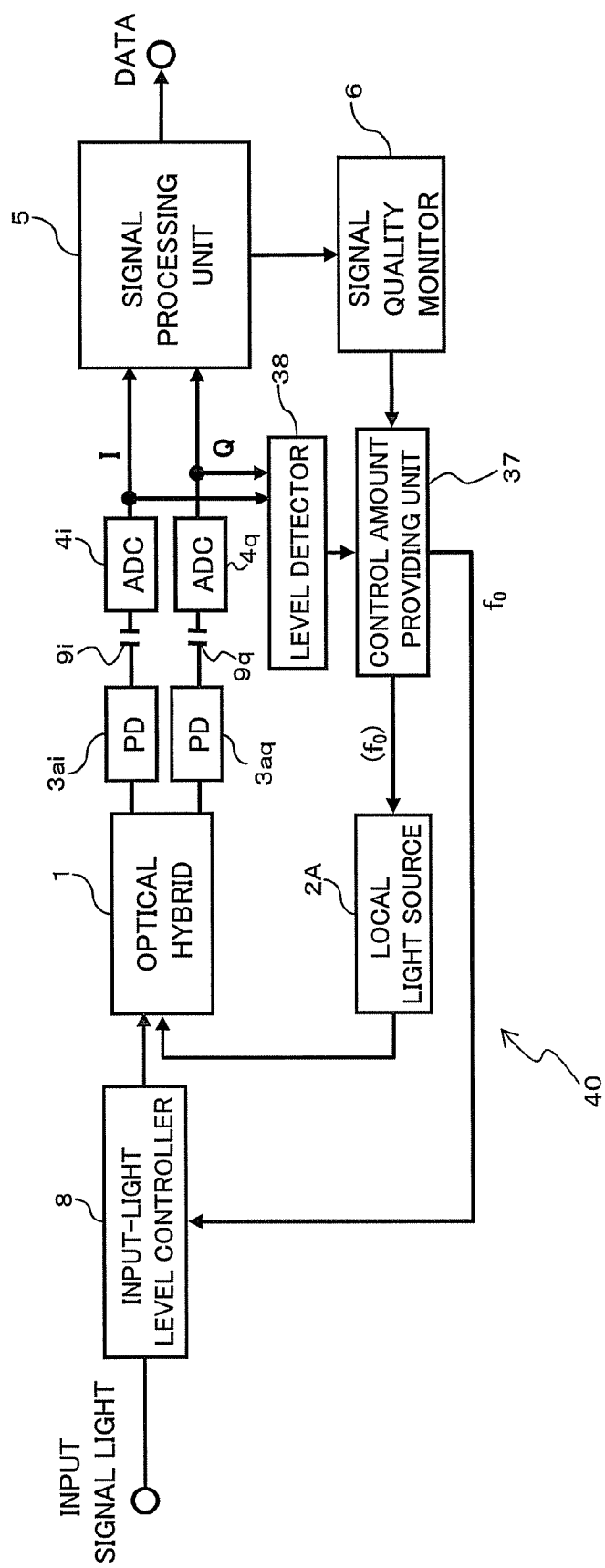
FIG. 13 is a block diagram schematically illustrating the configuration of a fourth embodiment.

FIG. 13 is a block diagram schematically illustrating the fourth embodiment. The optical receiver 40 of FIG. 13 includes a controlling amount providing unit 37, which is different from the controlling amount providing unit 17 of the second embodiment, and a level detector 38. The remaining configuration of the optical receiver 40 is substantially the same as the optical receiver 20 of FIG. 9. In FIG. 13, parts and elements represented by reference numbers the same as those in FIG. 9 are the substantially same parts and elements as those of FIG. 9.

The level detector 38 is an example of a level monitor that monitors the level of digital signals from the ADCs 4i and 4q. Specifically, the level detector 38 captures the values (sampling values) of digital signals that the ADCs 4i and 4q output for a predetermined time, obtains the intensity distribution of electric intensity modulated signals and obtains an amplitude histogram from the intensity distribution.

Figure 14:
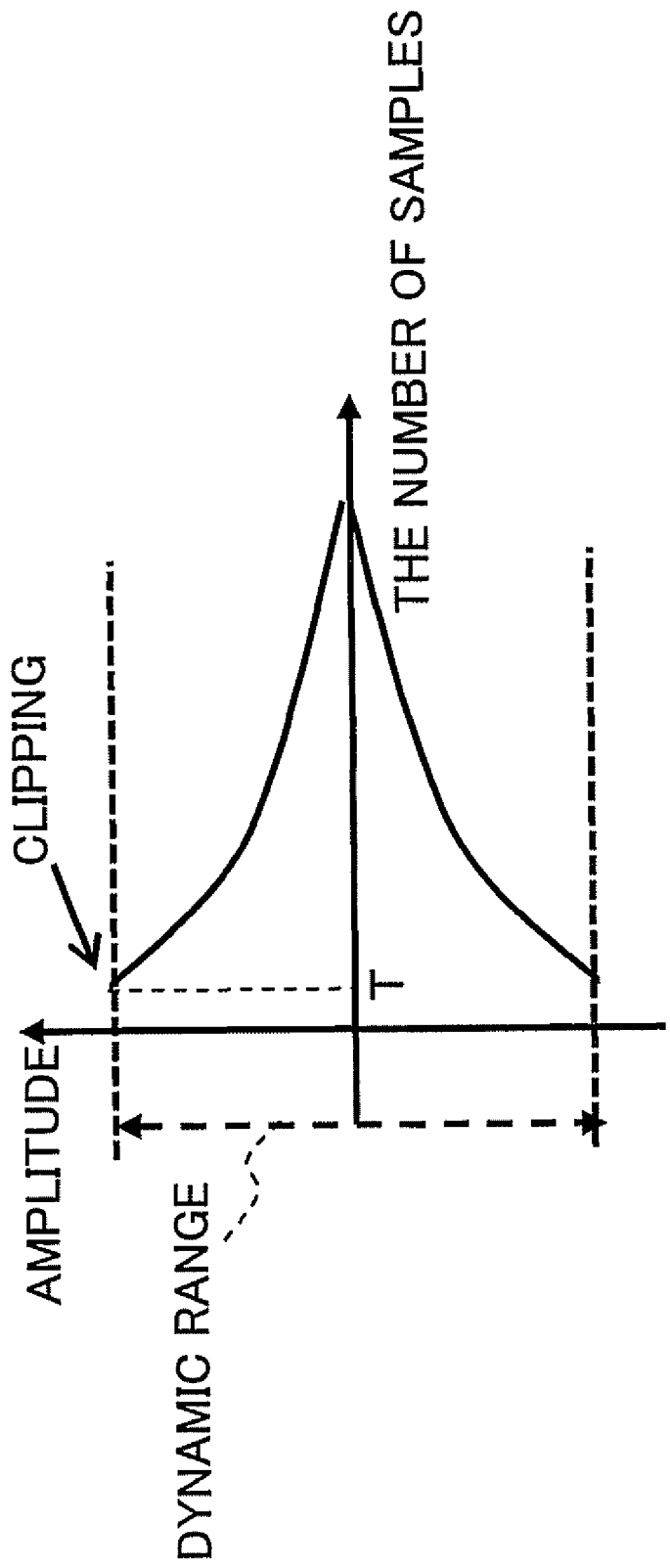
FIG. 14 is a diagram illustrating an operation of the fourth embodiment.
Figure 15:
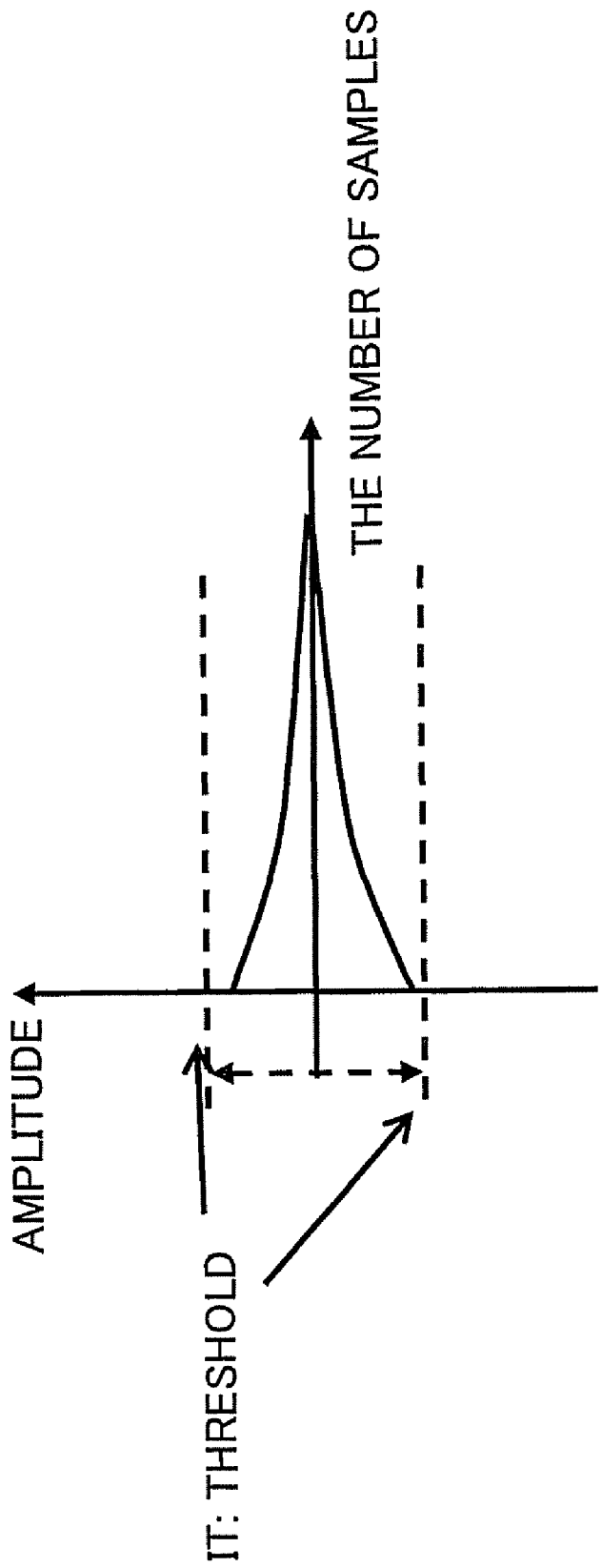
FIG. 15 is a diagram illustrating an operation of the fourth embodiment.

The controlling amount providing unit 37 controls the power ratio between the signal light and the local light in the same manner as performed in the first embodiment, and concurrently controls the amplitudes of the signal light and the local light on the basis of the result of detection by the level detector 38, maintaining the power ratio thus controlled. FIGS. 14 and 15 describe modes of controlling the amplitudes of the signal light and the local light by the controlling amount providing unit 37.

The controlling amount providing unit 37 calculates, on the basis of the amplitude histogram obtained by the level detector 38, the number of sample values clipped during a predetermined time period. In other words, the controlling amount providing unit 37 calculates the number of sample values attached to the upper or lower limit of the dynamic range of the amplitude of the ADCs 4i and 4q. For example, as illustrated in FIG. 14, when the calculated number of sample values exceeds a predetermined threshold T, the controlling amount providing unit 37 reduces the amplitudes of the signal light and the local light by a predetermined ratio, maintaining the power ratio being controlled in the same manner as the first embodiment.

Specifically, the controlling amount providing unit 37 provides amounts of controlling (outputs control signals) to the input light level controller 8 and the local light source 2A and thereby reduces the amplitudes of the signal light and the local light that is to be input into the optical hybrid 1 by a predetermined ratio (e.g., approximately 3 percents), which reduces the number of sample values attached to the upper or lower limit of the dynamic range of the amplitudes of the ADCs 4i and 4q. Consequently, inputs into the ADCs 4i and 4q can be signals having optimum amplitudes for sampling.

The controlling amount providing unit 37 counts the number of samples which exceed a predetermined amplitude threshold IT during a predetermined time period with reference to the amplitude histogram attained by the level detector 38. For example, when there is no sample value exceeding the above amplitude threshold IT as illustrated in FIG. 15, the controlling amount providing unit 37 increases the amplitudes of the signal light and the local light by a predetermined ratio, maintaining the power ratio being controlled in the same manner as the first embodiment.

Specifically, the controlling amount providing unit 37 provides amounts of controlling (outputs control signals) to the input light level controller 8 and the local light source 2A and thereby increases the amplitudes of the signal light and the local light that are to be input into the optical hybrid 1 by a predetermined ratio (e.g., approximately 3 percents), which widens the intensity distribution to the dynamic range of the amplitude for sampling in the ADCs 4i and 4q so that inputs into the ADCs 4i and 4q can be used as signals having amplitudes optimized for sampling. Here, the amplitude threshold IT is a value which can serve as a judging index to optimally carry out sampling in the ADCs 4i and 4q and which is smaller than the amplitude corresponding to the upper or lower limit of the dynamic range of the ADCs 4i and 4q.

Figure 16:
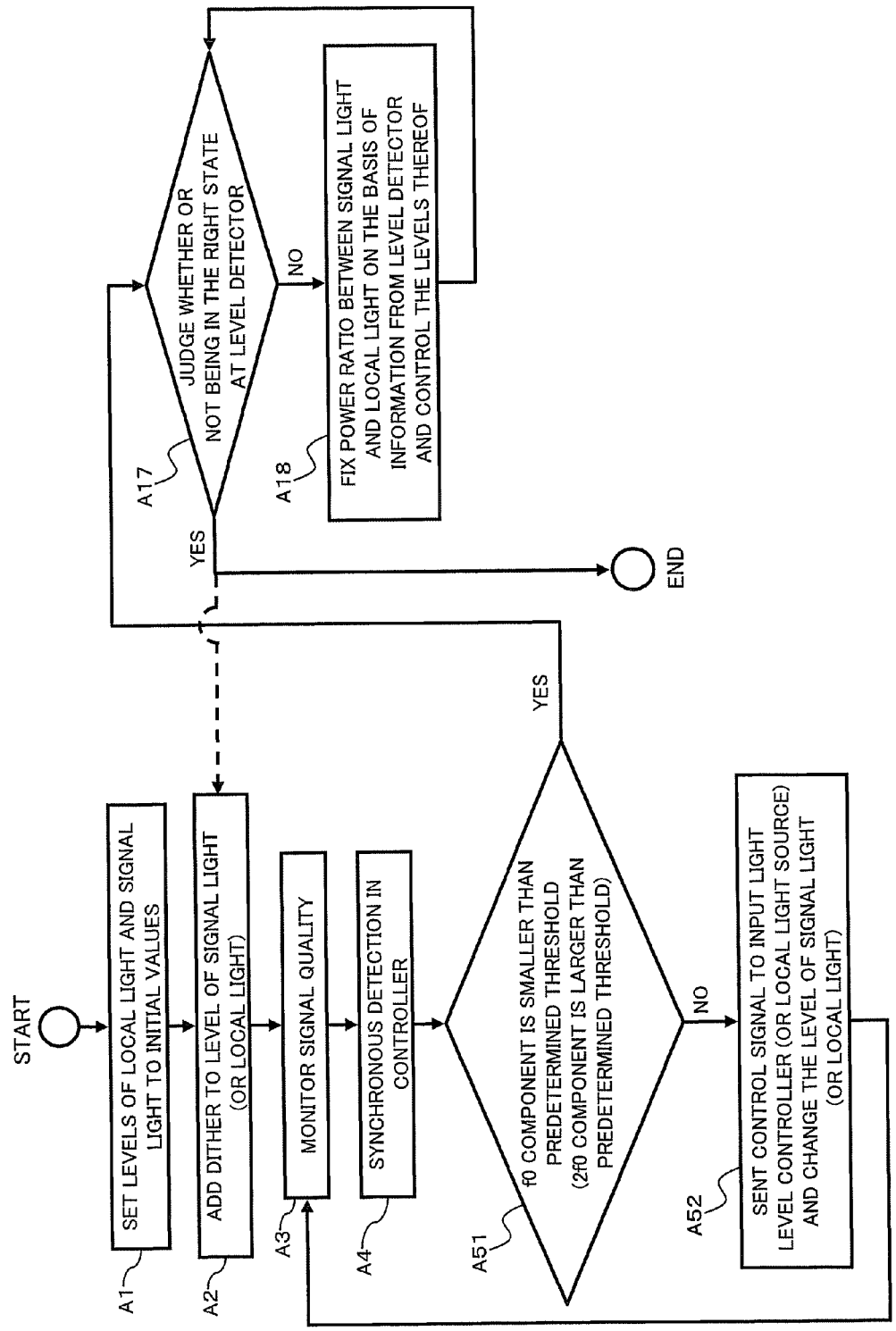
FIG. 16 is a flow diagram illustrating a succession of procedural steps of an operation of the fourth embodiment.

FIG. 16 is a flow diagram illustrating an example of operation of the optical receiver 40 of the fourth embodiment. To begin with, the controlling amount providing unit 37 in the optical receiver 40 controls the power ratio between the signal light and the local light (steps A1 through A4, and steps A51 and A52) in the same manner as the flow diagrams of FIGS. 3 and 9. Specifically, the controlling amount providing unit 37 continues control of the level of the signal light until the extracted frequency-f0 component comes to be smaller than a predetermined threshold value (or the 2f0 component comes to be larger than a predetermined threshold value), that is, until the threshold condition is satisfied (from NO route in step A51 via step A52 to step A3).

Then, the controlling amount providing unit 37 controls the signal light power and the local light power in steps of predetermined ratio, maintaining the power ratio being controlled until the amplitude histogram obtained by the level detector 38 comes to be in the right state (from YES route in step A51 via step A17 to step A18). Specifically, the controlling amount providing unit 37 calculates the number of sample values clipped in a predetermined time period on the basis of the amplitude histogram obtained by the level detector 38. Furthermore, the controlling amount providing unit 37 calculates the number of sample values exceeding the predetermined amplitude threshold in a predetermined time period with reference to the amplitude histogram obtained by the level detector 38.

If the calculated number of sample values exceeds the predetermined threshold T (see FIG. 14), the controlling amount providing unit 37 decreases the amplitudes of the signal lights and the local lights by a predetermined ratio, maintaining the above power ratio. Conversely, if no sample value exceeds the amplitude threshold IT (see FIG. 15), the controlling amount providing unit 37 increases the amplitudes of the signal lights and the local lights by a predetermined ratio, maintaining the above power ratio (from NO route in step A17 to step A18).

When the histogram obtained by the level detector 38 comes to be in the right state, the controlling amount providing unit 37 halts the control over the signal light power and the local light power (YES route in step A17). Alternatively, the control of the level ratio between the signal light and the local light may be resumed (the dotted-line route from YES route in step A17 to step A2).

Consequently, the fourth embodiment can nestle the power ratio between the signal light power and the local light power at least within a constant range so that the quality of receiving signals can be advantageously maintained to be fine.

Furthermore, the amplitudes of the signal light and the local light can also be optimized to contribute to further improvement in quality of the receiving signals.

[F] Fifth Embodiment

Figure 17:
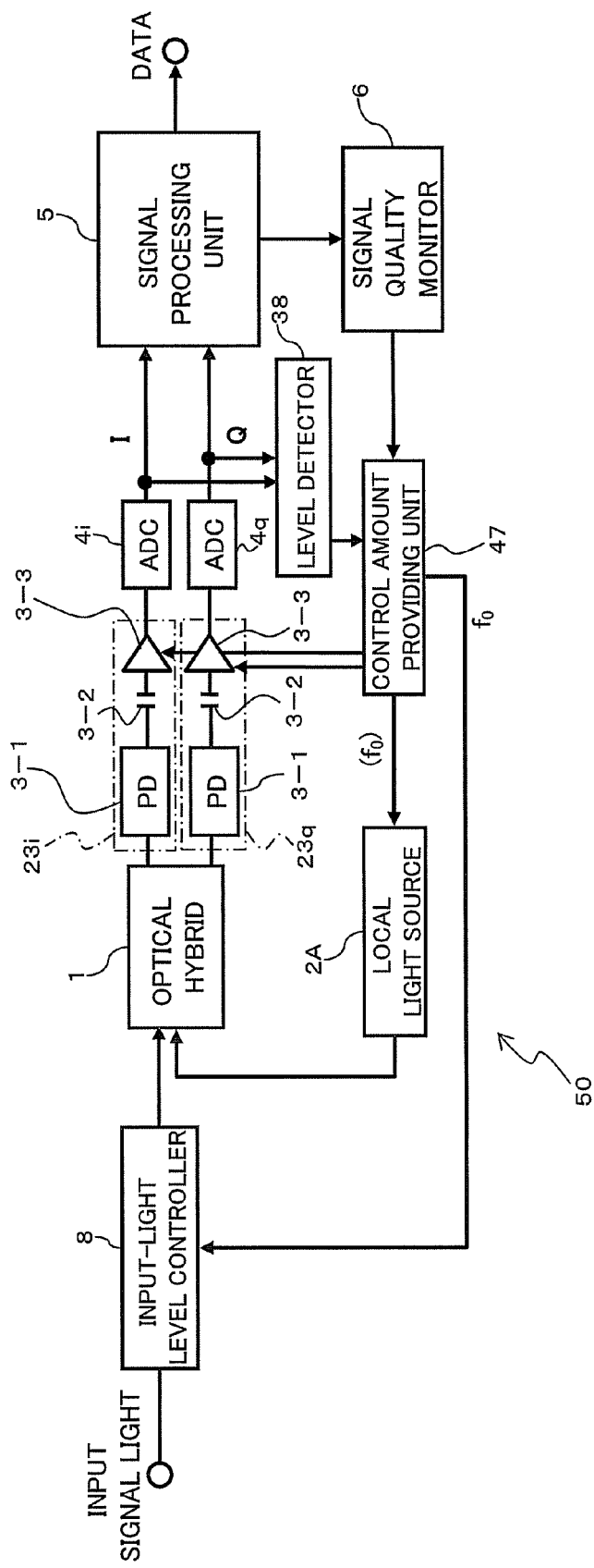
FIG. 17 is a block diagram schematically illustrating the configuration of the fifth embodiment.

FIG. 17 is a block diagram schematically illustrating the fifth embodiment. The optical receiver 50 illustrated in FIG. 17 includes light receiving devices 23i and 23q and the controlling amount providing unit 47 which are different from those of the fourth embodiment, but the remaining configuration is substantially identical to that of the fourth embodiment. In FIG. 17, parts and elements represented by reference numbers the same as those in FIG. 13 are the substantially same parts and elements as those of FIG. 13.

The light receiving devices 23i and 23q are identical to those of the third embodiment (see FIG. 11) and each include the single-end photodiode 3-1, the AC coupler 3-2, and the amplifier 3-3.

The controlling amount providing unit 47 controls the power ratio between the signal light and the local light on the basis of the result of the monitoring by the signal quality monitor 6 in the same manner as performed in the first embodiment. Furthermore, the controlling amount providing unit 47 controls the gains of the amplifiers 3-3 included in the respective light receiving devices 23i and 23q on the basis of the amplitude histogram obtained by the level detector 38.

Thereby, the levels of signals that are to be input into the ADCs 4i and 4q are consequently controlled such that the quality of receiving signal monitored by the signal quality monitor 6 is optimized in the same manner as performed in the fourth embodiment.

The foregoing fourth embodiment controls the levels of the signal light and the local light that are to be input into the optical hybrid 1. As an alternative, the quality of receiving signals can be similarly optimized by controlling the signal levels of electric signals that are to be input into the ADCs 4i and 4q through controlling the gain of the amplifiers 3-3 as performed in the fifth embodiment.

Figure 18:
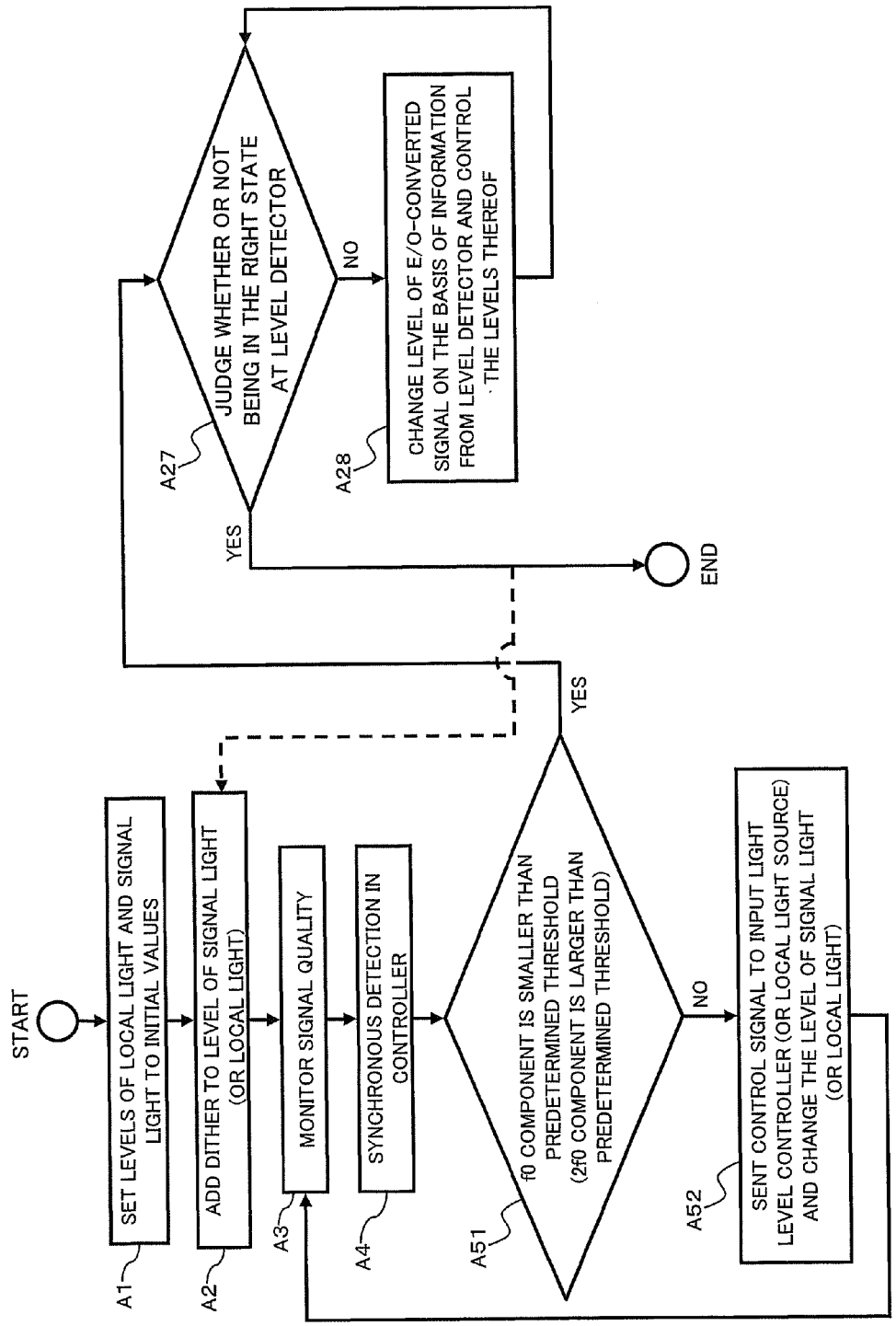
FIG. 18 is a flow diagram illustrating a succession of procedural steps of an operation of the fifth embodiment.

FIG. 18 is a flow diagram illustrating an example of operation in the optical modulator 50 of the fifth embodiment. To begin with, the controlling amount providing unit 47 controls the power ratio between the signal light and the local light (steps A1 through A4, and steps A51 and A52) in the same manner as the flow diagram FIG. 3. Specifically, the controlling amount providing unit 47 continues control of the level of the signal light until the extracted frequency-f0 component comes to be smaller than a predetermined threshold value (or the 2f0 component comes to be larger than a predetermined threshold value), that is, until the threshold condition is satisfied (from NO route in step A51 via step A52 to step A3).

Then, the controlling amount providing unit 47 controls the gain of each amplifier 3-3 in steps of predetermined ratio, maintaining the power ratio being controlled until the amplitude histogram obtained by the level detector 38 comes to be in the right state (from YES route in step A51 via step A27 to step A28). Specifically, the controlling amount providing unit 47 calculates the number of sample values clipped in a predetermined time period on the basis of the amplitude histogram obtained by the level detector 38. Furthermore, the controlling amount providing unit 7 calculates the number of sample values exceeding the predetermined amplitude threshold in a predetermined time period.

If the calculated number of sample values exceeds the predetermined threshold T (see FIG. 14), the controlling amount providing unit 47 decreases the respective gains of the amplifiers 3-3 of the light receiving devices 23$i$ and 23$q$ by a predetermined ratio, maintaining the above power ratio. Conversely, if no sample value exceeds the amplitude threshold IT (see FIG. 15), the controlling amount providing unit 47 increases the respective amplitudes of the amplifiers 3-3 of the light receiving devices 23$i$ and 23$q$ by a predetermined ratio, maintaining the above power ratio (from NO route in step A27 to step A28).

When the histogram obtained by the level detector 38 comes to be in the right state, the controlling amount providing unit 47 fixes the gains of the amplifiers 3-3 (YES route in step A27). Alternatively, the control of the level ratio between the signal light and the local light may be resumed (the dotted-line route from YES route in step A27 to step A2).

Consequently, the fifth embodiment can nestle the power ratio between the signal light power and the local light power at least within a constant range so that the quality of receiving signals can be advantageously maintained to be fine.

Furthermore, the amplitudes of the signal light and the local light can also be optimized to contribute to further improvement in quality of the receiving signals.

[G] Sixth Embodiment

Figure 19:
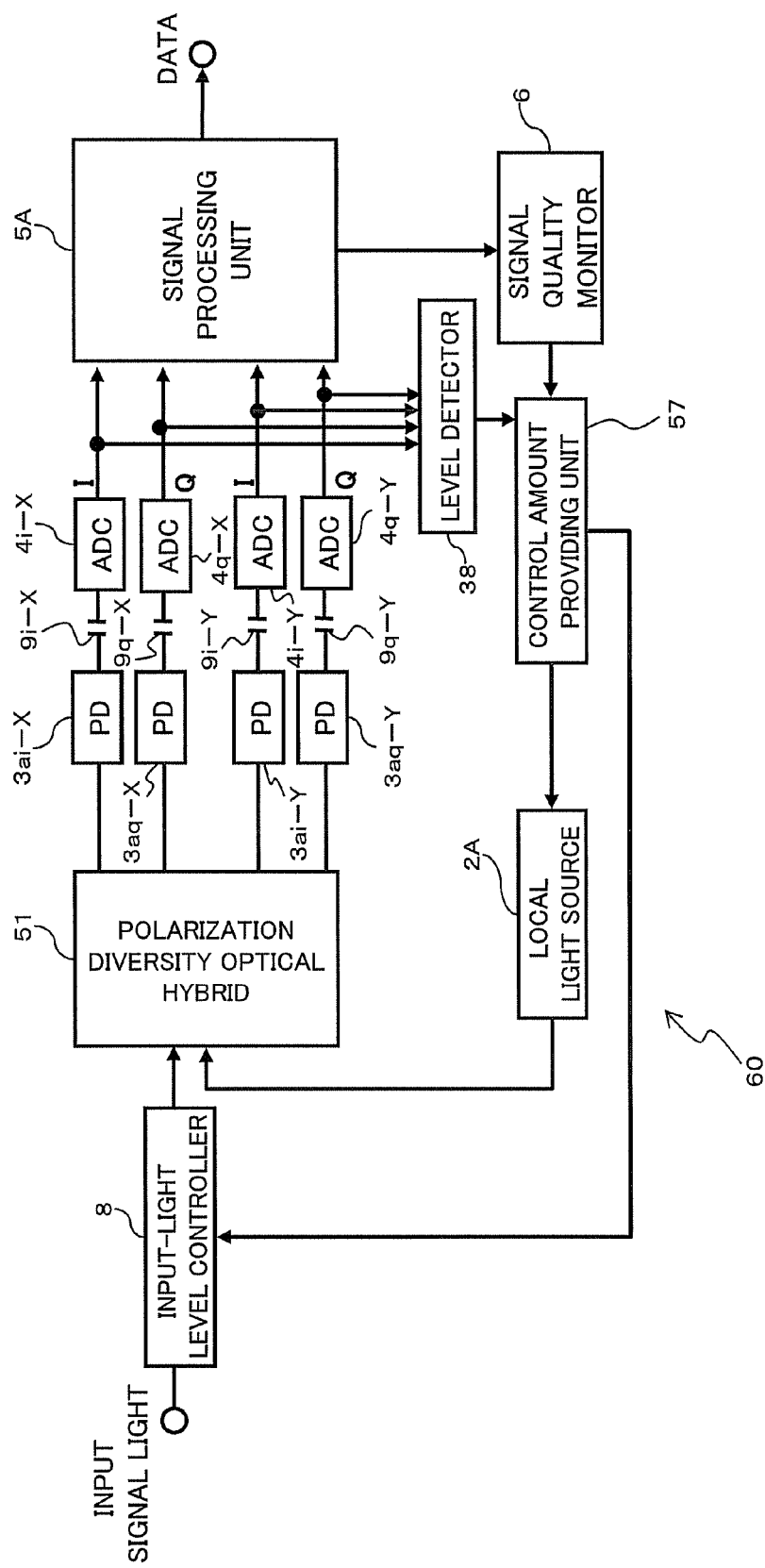
FIG. 19 is a block diagram schematically illustrating an operation of the sixth embodiment.

FIG. 19 is a block diagram schematically illustrating the sixth embodiment. An optical receiver 60 of FIG. 19 receives a light signal adopting the polarization multiplexing scheme using two different polarization components as multiplexing elements of optical modulation, differently from the fourth embodiment. For the above, the optical receiver 60 includes a polarization diversity optical hybrid 51, light receiving devices 3$ai$-X, 3$aq$-X, 3$ai$-Y, and 3$aq$-Y, AC couplers 9$i$-X, 9$q$-X, 9$i$-Y, and 9$q$-Y, ADCs 4$i$-X, 4$q$-X, 4$i$-Y, and 4$q$-Y, and a signal processing unit 5A. Furthermore, the optical receiver 60 includes the signal quality monitor 6, the controlling amount providing unit 57, the level detector 38, the local light source 2A, and the input light level controller 8 the same as those of the fourth embodiment.

The polarization diversity optical hybrid 51 receives signal light subjected to polarization multiplexing from the input light level controller 8 and concurrently receives local light from the local light source 2A so that in-phase signal light I and quadrature-phase signal light Q are output for each of two polarization components (i.e., the X polarization component and the Y polarization component). Accordingly, the polarization diversity optical hybrid 51 is an example of a mixer which mixes the input light and the local light to thereby obtain the in-phase signal lights and the quadrature-phase signal lights. Here, the polarization diversity optical hybrid 51 includes Polarization Beam Splitters (PBS) 51$a$ and 51$b$ and optical hybrids 51$x$ and 51$y$, as illustrated in example FIG. 20.

Figure 20:
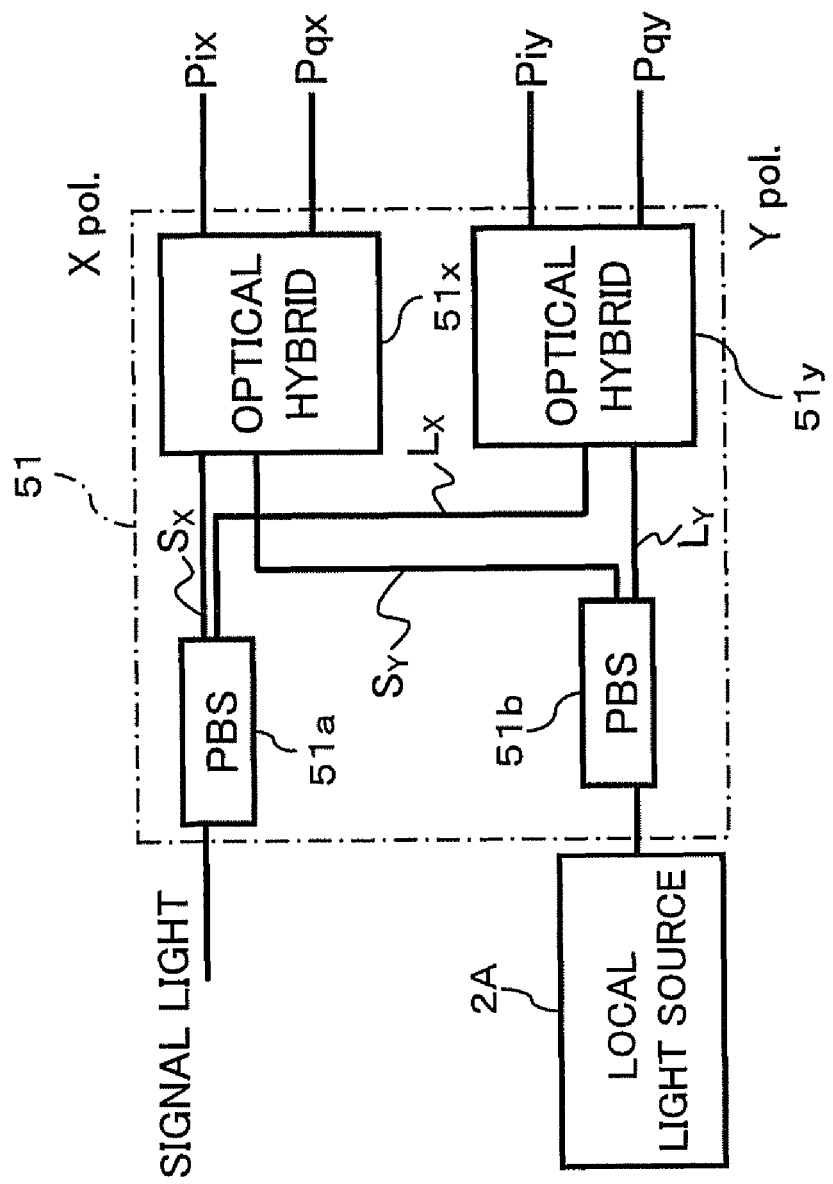
FIG. 20 is a flow diagram illustrating an operation of the sixth embodiment.

In FIG. 20, the PBS 51$a$ divides signal light input from the optical transmission path through the input light level controller 8 into two polarization components (the X polarization component Sx and the Y polarization component Sy) orthogonal to each other and introduces the components to different optical hybrids 51$x$ and 51$y$, respectively. The PBS 51$b$ divides signal light input from the local light source 2A into two polarization components (the X polarization component Lx and the Y polarization component Ly) orthogonal to each other and introduces the components to different optical hybrids 51$x$ and 51$y$, respectively.

The optical hybrids 51$x$ and 51$y$ have the same configuration as the optical hybrid 1 of the foregoing embodiments. Therefore, the optical hybrid 51$x$ mixes the X polarization component of the orthogonal polarization components of the signal light and the X polarization component of the orthogonal polarization components of the local light and consequently outputs in-phase signal light Pix and quadrature-phase signal light Pqx. Similarly, the optical hybrid 51$y$ outputs in-phase signal light Ply and quadrature-phase signal light Pqy.

The light receiving devices 3$ai$-X, 3$ai$-Y, 3$aq$-X, and 3$aq$-Y respectively receive in-phase signal lights Pix and Piy, and quadrature-phase signal lights Pqx and Pqy, and outputs analog electric in-phase signals Pix and Piy, and analog electric quadrature-phase signals Pqx and Pqy, respectively, serving electric intensity modulated signals. The AC couplers 9$i$-X, 9$i$-Y, 9$q$-X, and 9$q$-Y removes DC components contained in the electric intensity modulated signals of in-phase signals Pix and Piy and the quadrature-phase signals Pqx and Pqy, respectively. Further, the ADCs 4$i$-X, 4$i$-Y, 4$q$-X, and 4$q$-Y respectively convert the electric intensity modulated signals of in-phase signals Pix and Piy and the quadrature-phase signals Pqx and Pqy, from which DC components are removed, into digital signals and output the converted signals to the signal processing unit 5A.

The signal processing unit 5A receives the digital signals corresponding to the electric intensity modulated signals of in-phase signal Pix and Piy and the quadrature-phase signal Pqx and Pqy respectively from the ADCs 4$i$-X, 4$i$-Y, 4$q$-X, and 4$q$-Y and carries out signal processing such as waveform equalizing processing and decoding processing.

The level detector 38 captures values of digital signals from the ADCs 4$i$-X, 4$q$-X, 4$i$-Y, and 4$q$-Y, in a predetermined manner, thereby obtains the intensity distribution of the electric intensity modulated signals, and derives an amplitude histogram from the intensity distribution. Alternatively, the level detector 38 may capture the ADCs outputs of the in-phase signals Pix and Piy and the quadrature-phase signals Pqx and Pqy of either one (for example, the X polarization) of the two polarization components and thereby derives the amplitude histogram based on the captured output.

The controlling amount providing unit 57 controls the power ratio between the signal light and the local light in the same manner as performed in the fourth embodiment, and also controls the amplitudes of the signal light and the local light on the basis of the result of detection by the level detector 38, maintaining the power ratio being controlled.

Consequently, the sixth embodiment can nestle the power ratio between the signal light power and the local light power at least within a constant range so that the quality of receiving signals can be advantageously maintained to be fine.

Furthermore, the amplitudes of the signal light and the local light can also be optimized to contribute to further improvement in quality of the receiving signals.

[H] Others

The above embodiments can be variously modified without departing from the gist of the disclosure.

For example, the light receiving device of each embodiment is a single-end photodiode, but may alternatively be a twin photodiode, which ensures the same advantages as those of the foregoing embodiments.

When a light signal subjected to polarization multiplexing is received in the configurations of the first through the third embodiments and the fifth embodiment, these configurations can be modified in conformity with that of the sixth embodiment.

Further, the optical receiver of the claims can be produced with reference to the above disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) has (have) been described in detail, it should be understood that the various changes, substitutions, and alterations could be made hereto without departing from the spirit and scope of the invention.

What is claimed is:

1. An optical receiver comprising:
a mixer which mixes input light and local light to obtain in-phase signal light and quadrature-phase signal light;
a light receiving device which receives the in-phase signal light and the quadrature-phase signal light and converts the in-phase signal light and the quadrature-phase signal light into respective analog electric signals;
an analog-to-digital converter which converts the analog electric signals into respective digital signals;
a signal processor which performs digital signal processing using each of the digital signals;
a monitor which monitors a quality of a receiving signal with reference to information obtained through the digital signal processing; and
a controller which controls, on the basis of the result of the monitoring by the monitor, a power ratio between the input light and the local light that are to be mixed with each other.

2. The optical receiver according to claim 1, wherein the mixer mixes the input light and each of two of the local lights that have a phase difference of approximately 90 degrees, and outputs the in-phase signal light and the quadrature-phase signal light.

3. The optical receiver according to claim 2, wherein the light receiving device comprises single-end photodiodes provided one for each of the signal lights output from the mixer.

4. The optical receiver according to claim 3, the controller comprising:
an input-light level controller which controls the level of the input light that is to be input into the mixer;
a local-light level controller which controls the levels of the local lights that is to be input into the mixer; and
a controlling amount providing unit which provides the input-light level controller and the local-light level controller with amounts of level to be controlled, and thereby controls the power ratio, the amounts being based on the result of monitoring by the monitor.

5. The optical receiver according to claim 4, wherein the controlling amount providing unit controls the amplitudes of the input light and the local lights while maintaining the power ratio on the basis of the result of the monitoring by the monitor.

6. The optical receiver according to claim 4, wherein:
the light receiving device comprises, for each of the signal lights to be received,
a single end photodiode which receives the signal light, and
an amplifier which amplifies an output from the light receiving device and outputs an analog signal corresponding to the amplitude of the signal light,
the controlling amount providing unit controlling individual gain of the amplifier while maintaining the power ratio on the basis of the result of the monitoring by the monitor.

7. The optical receiver according to claim 4, further comprising a level monitor which monitors the levels of the digital signals from the analog-to-digital converter,
the controlling amount providing unit controlling individual gains of the amplifiers on the basis of the result of the monitoring by the level monitor while maintaining the power ratio.

8. The optical receiver according to claim 2, wherein the light receiving device comprises twin photodiodes provided one for each of the signal lights output from the mixer.

9. The optical receiver according to claim 2, wherein the light receiving device comprises, for each of the signal lights to be received,
a light receiving device which receives the signal light, and
an amplifier which amplifies an output from the light receiving device and outputs an analog signal corresponding to the amplitude of the signal light.

10. The optical receiver according to claim 2, wherein:
the mixer outputs the in-phase signal light and the quadrature-phase signal light of each of two polarization components, different from each other, of the input light;
a plurality of the light receiving devices are provided each for one of the in-phase signal light and the quadrature-phase signal light of the polarization component; and
a plurality of the analog-to-digital converters are provided each for one of the in-phase signal light and the quadrature-phase signal light of the polarization component.

11. The optical receiver according to claim 2, the controller comprising:
an input-light level controller which controls the level of the input light that is to be input into the mixer;
a local-light level controller which controls the levels of the local lights that is to be input into the mixer; and
a controlling amount providing unit which provides the input-light level controller and the local-light level controller with amounts of level to be controlled, and thereby controls the power ratio, the amounts being based on the result of monitoring by the monitor.

12. The optical receiver according to claim 11, wherein the controlling amount providing unit controls the amplitudes of the input light and the local lights while maintaining the power ratio on the basis of the result of the monitoring by the monitor.

13. The optical receiver according to claim 11, wherein:
the light receiving device comprises, for each of the signal lights to be received,
a single end photodiode which receives the signal light, and
an amplifier which amplifies an output from the light receiving device and outputs an analog signal corresponding to the amplitude of the signal light,
the controlling amount providing unit controlling individual gain of the amplifier while maintaining the power ratio on the basis of the result of the monitoring by the monitor.

14. The optical receiver according to claim 11, further comprising a level monitor which monitors the levels of the digital signals from the analog-to-digital converter,
the controlling amount providing unit controlling individual gains of the amplifiers on the basis of the result of the monitoring by the level monitor while maintaining the power ratio.

15. The optical receiver according to claim 1, the controller comprising:
- an input-light level controller which controls the level of the input light that is to be input into the mixer;
- a local-light level controller which controls the level of the local light that is to be input into the mixer; and
- a controlling amount providing unit which provides the input-light level controller and the local-light level controller with amounts of level to be controlled, and thereby controls the power ratio, the amounts being based on the result of monitoring by the monitor.

16. The optical receiver according to claim 15, wherein the controlling amount providing unit controls the amplitudes of the input light and the local light while maintaining the power ratio on the basis of the result of the monitoring by the monitor.

17. The optical receiver according to claim 15, wherein:
- the light receiving device comprises, for each of the signal lights to be received,
  - a single end photodiode which receives the signal light, and
  - an amplifier which amplifies an output from the light receiving device and outputs an analog signal corresponding to the amplitude of the signal light,
- the controlling amount providing unit controlling individual gain of the amplifier while maintaining the power ratio on the basis of the result of the monitoring by the monitor.

18. The optical receiver according to claim 15, further comprising a level monitor which monitors the levels of the digital signals from the analog-to-digital converter,
- the controlling amount providing unit controlling individual gains of the amplifiers on the basis of the result of the monitoring by the level monitor while maintaining the power ratio.

19. The optical receiver according to claim 1, wherein the controller controls, on the basis of the result of the monitoring by the monitor, the power ratio between the input light and the local light that are to be mixed with each other, by dithering one of the input light and the local light.

20. A method for optical reception comprising:
- mixing input light and local light to thereby obtain in-phase signal light and quadrature-phase signal light;
- converting the in-phase signal light and the quadrature-phase signal light into respective analog electric signals;
- converting the analog electric signals into respective digital signals;
- performing digital signal processing using each of the digital signals;
- monitoring a quality of a receiving signal with reference to information obtained through the digital signal processing; and
- controlling, on the basis of the result of the monitoring, a power ratio between the input light and the local light that are to be mixed with each other.

* * * * *